US012549981B2

(12) United States Patent
Opshaug et al.

(10) Patent No.: US 12,549,981 B2
(45) Date of Patent: Feb. 10, 2026

(54) MEASUREMENT GAPS FOR POSITIONING MEASUREMENTS OUTSIDE BANDWIDTH PART

(71) Applicant: QUALCOMM Incorporated, San Diego, CA (US)

(72) Inventors: Guttorm Ringstad Opshaug, Redwood City, CA (US); Alexandros Manolakos, Escondido, CA (US); Sony Akkarakaran, Poway, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 16/939,697

(22) Filed: Jul. 27, 2020

(65) Prior Publication Data
US 2021/0067990 A1  Mar. 4, 2021

(30) Foreign Application Priority Data

Aug. 28, 2019 (GR) .............................. 20190100374

(51) Int. Cl.
*H04L 12/00* (2006.01)
*H04W 4/029* (2018.01)
(Continued)

(52) U.S. Cl.
CPC ........... *H04W 24/10* (2013.01); *H04W 4/029* (2018.02); *H04W 24/08* (2013.01); *H04W 72/04* (2013.01)

(58) Field of Classification Search
CPC ..... H04W 24/10; H04W 4/029; H04W 24/08; H04W 72/04
See application file for complete search history.

(56) References Cited

U.S. PATENT DOCUMENTS

2012/0307670 A1  12/2012  Kazmi et al.
2018/0343635 A1  11/2018  Edge et al.
(Continued)

FOREIGN PATENT DOCUMENTS

CN  103329604 A  9/2013

OTHER PUBLICATIONS

Huawei: "Discussion on DL Positioning Procedure", 3GPP Draft, 3GPP TSG-RAN3 Meeting #104, R3-192728, Discussion on DL Positioning Procedure RO, 3rd Generation Partnership Project (3GPP), Mobile Competence Centre, 650, Route Des Lucioles, F-06921 Sophia-Antipolis Cedex, France, vol. RAN WG3, No. Reno, Nevada, US, May 3, 2019-May 17, 2019, May 3, 2019 (May 3, 2019), XP051712926, 4 pages, Retrieved from the Internet: URL: http://www.3gpp.org/ftp/tsg%5Fran/WG3%5Flu/TSGR3%5F104/Docs/R3%2D192728%2Ezip. [retrieved on May 3, 2019] 1 Introduction 2.1 DL-AoD positioning procedure (figure on p. 2, step 3) 3 Conclusion.

(Continued)

*Primary Examiner* — Noel R Beharry
*Assistant Examiner* — Lionel Preval
(74) *Attorney, Agent, or Firm* — Thien T. Nguyen

(57) ABSTRACT

An entity, such as the base station, user equipment (UE) or location server may determine that the UE should be configured with a measurement gap for intra-frequency positioning measurements outside the downlink (DL) bandwidth part (BWP) of the UE. The determination may be based several factors including whether the DL BWP is less than the available bandwidth for the positioning signals transmitted by the base station, with the same or differing numerologies, if a number of resource blocks for the DL BWP is less than a minimum number of resource blocks required by the UE, or if the DL BWP is less than a minimum fraction of a total available bandwidth of the DL (Continued)

PRS signals, or based on a desired positioning accuracy of the UE.

32 Claims, 11 Drawing Sheets

(51) Int. Cl.
*H04W 24/08* (2009.01)
*H04W 24/10* (2009.01)
*H04W 72/04* (2023.01)

(56) References Cited

U.S. PATENT DOCUMENTS

| | | | |
|---|---|---|---|
| 2019/0052996 A1 | 2/2019 | Sahai et al. | |
| 2019/0166513 A1* | 5/2019 | Lin | H04W 24/10 |
| 2020/0267685 A1* | 8/2020 | Qi | H04B 7/0617 |
| 2021/0014751 A1* | 1/2021 | Callender | H04W 72/0446 |
| 2021/0076240 A1* | 3/2021 | Koziol | H04W 24/10 |
| 2021/0239783 A1* | 8/2021 | Calcev | G01S 5/0215 |
| 2021/0351887 A1* | 11/2021 | Qi | H04L 5/005 |
| 2021/0410097 A1* | 12/2021 | Munier | H04L 1/0067 |
| 2022/0050163 A1* | 2/2022 | Si | H04W 24/02 |
| 2022/0104059 A1* | 3/2022 | Hu | H04W 24/02 |
| 2022/0131727 A1* | 4/2022 | Khoryaev | H04L 27/261 |

OTHER PUBLICATIONS

International Search Report and Written Opinion—PCT/US2020/043909—ISA/EPO—Nov. 18, 2020.

Qualcomm Incorporated: "Summary of 7.2.10.4: PHY Procedures for Positioning Measurements", 3GPP Draft, 3GPP TSG-RAN WG1 Meeting #97, R1-1907675 (FL Summary for 7.2.10.4—PHY Procedures for Positioning Measurements), 3rd Generation Partnership Project (3GPP), Mobile Competence Centre, 650, Route Des Lucioles, F-06921, vol. RAN WG1, No. Reno, Nevada, USA, May 13, 2019-May 17, 2019, May 16, 2019 (May 16, 2019), XP051739964, 18 pages, Retrieved from the Internet: URL: http://www.3gpp.org/ftp/tsg%5Fran/WG1%5FRL1/TSGR1%5F97/Docs/R1%2D1907675%2Ezip. [retrieved on May 16, 2019] 1b Bandwidth part operation Proposal 1 (p. 3) 3a DL PRS configuration aspects.

Qualcomm Incorporated: "Considerations on Phy-Layer Procedures for NR Positioning", 3GPP Draft, 3GPP TSG RAN WG1 #97, R1-1907299, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019 May 13, 2019 (May 13, 2019), XP051728739, 10 Pages, Retrieved from the Internet: URL:http://www.3gpp.org/ftp/Meetings%5F3GPP%5FSYNC/RAN1/Docs/R1%2D1907299%2Ezip [retrieved on May 13, 2019], Section 1, p. 1, Section 3, p. 4, Section 4, p. 5.

Taiwan Search Report—TW109127019—TIPO—Dec. 12, 2023.

VIVO: "Discussion on Physical-Layer Procedures for UE/gNB Measurements", 3GPP TSG RAN WG1 #97, R1-1906180, 3rd Generation Partnership Project, Mobile Competence Centre, 650, Route Des Lucioles, F-06921 Sophia-Antipolis Cedex, France, vol. RAN WG1, No. Reno, USA, May 13, 2019-May 17, 2019, May 13, 2019, 6 Pages, XP051727634, paragraph [0002].

European Search Report—EP251515474—Search Authority—Munich—May 7, 2025.

* cited by examiner

MEASUREMENT GAPS FOR POSITIONING MEASUREMENTS OUTSIDE BANDWIDTH PART

CROSS-REFERENCE TO RELATED APPLICATIONS

This application claims priority to and the benefit of Greek Patent Application No. 20190100374, entitled "MEASUREMENT GAPS FOR POSITIONING MEASUREMENTS OUTSIDE BANDWIDTH PART," filed Aug. 28, 2019, which is assigned to the assignee hereof and which is expressly incorporated herein by reference in its entirety.

BACKGROUND

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A wireless communication network may include a number of base stations or node Bs that can support communication for a number of UEs. A UE may communicate with a base station via downlink and uplink. The downlink (or forward link) refers to the communication link from the base station to the UE, and the uplink (or reverse link) refers to the communication link from the UE to the base station.

A base station may transmit data, control information, and positioning signals, e.g., Positioning Reference Signals (PRS) on the downlink to a UE and/or may receive data and control information on the uplink from the UE. New radio (NR) networks support flexible channel bandwidth design for both a network and a UE. For example, for Frequency Range 1 (FR1: 410 MHz-7125 MHz range), a channel bandwidth may vary between five (5) MHz and one hundred (100) MHz. The maximum transmission bandwidth configuration for each UE channel bandwidth and subcarrier spacing, for example, is described in 3GPP TS 38.101.-1, Table 5.3.2.-1. As a further example, for the band frequency above twenty-four (24) GHz, a channel bandwidth may vary between fifty (50) MHz and four hundred (400) MHz. Additionally, NR networks support scalable orthogonal frequency division multiple access (OFDMA) numerology. Scaling of subcarrier spacing (SCS) may address different needs by different radio access technologies (RATs). A wideband spectrum for NR networks can be divided into multiple non-overlapping sub-bands. One or more sub-bands may be located in a bandwidth part (BWP) assigned to the UE. Thus, the UE may use less than the entire bandwidth available in the wireless communication network.

The position of a UE may be estimated using the wireless network, which may be useful for many applications including, for example, emergency calls, personal navigation, asset tracking, locating a friend or family member, etc. A position estimate for a UE may be obtained, for example, based at least in part on the distances or pseudoranges from the UE to one or more base stations and the known locations of the one or more base stations. Additionally, or instead, the location of a UE may be obtained based at least in part on estimates of the angle of departure of a signal from one or more base stations with known locations and where the angle of departure is known either relative to the corresponding transmit antenna orientation or to a global angle reference, e.g. based on a cartesian East-North-Up coordinate system at the gNB transmission point. The distances or pseudoranges from the UE to the base stations may be determined using transmitted positioning signals, such as PRS signals. A UE, however, may measure the PRS signals using less than the available wideband spectrum if the UE is assigned a BWP, which may decrease positioning resolution or increase the time necessary to achieve a desired positioning resolution.

SUMMARY

An entity, such as the base station, user equipment (UE) or location server may determine that the UE should be configured with a measurement gap for intra-frequency positioning measurements outside the downlink (DL) bandwidth part (BWP) of the UE. The determination may be based several factors including whether the DL BWP is less than the available bandwidth for the positioning signals transmitted by the base station, with the same or differing numerologies, if a number of resource blocks for the DL BWP is less than a minimum number of resource blocks required by the UE, or if the DL BWP is less than a minimum fraction of a total available bandwidth of the DL PRS signals, or based on a desired positioning accuracy of the UE.

In one aspect, a method for supporting location of a user equipment (UE) performed by a base station in a wireless network may include determining to configure the UE with a measurement gap for intra-frequency positioning measurements outside a bandwidth part of the UE; configuring the measurement gap for the UE; and sending a message to the UE, the message comprising an indication of the measurement gap configured for the UE.

In one aspect, a base station in a wireless network capable of supporting location of a user equipment (UE), includes an external interface configured to receive and send messages to other entities in the wireless network; at least one memory; and at least one processor coupled to the external interface and the at least one memory, the at least one processor configured to: determine to configure the UE with a measurement gap for intra-frequency positioning measurements outside a bandwidth part of the UE; configure the measurement gap for the UE; and send a message to the UE via the external interface, the message comprising an indication of the measurement gap configured for the UE.

In one aspect, a base station in a wireless network capable of supporting location of a user equipment (UE), includes a means for determining to configure the UE with a measurement gap for intra-frequency positioning measurements outside a bandwidth part of the UE; a means for configuring the measurement gap for the UE; and a means for sending a message to the UE, the message comprising an indication of the measurement gap configured for the UE.

In one aspect, a non-transitory computer readable storage medium including program code stored thereon, the program code is operable to configure at least one processor in a base station in a wireless network capable of supporting location of a user equipment (UE), includes program code to determine to configure the UE with a measurement gap for intra-frequency positioning measurements outside a bandwidth part of the UE; program code to configure the measurement gap for the UE; and program code to send a message to the UE, the message comprising an indication of the measurement gap configured for the UE.

In one aspect, a method for supporting location of a user equipment (UE) performed by the UE, may include determining to use a measurement gap for intra-frequency positioning measurements outside a bandwidth part of the UE; sending a message to a base station in a wireless network requesting the measurement gap for intra-frequency positioning measurements; and receiving a message from the base station assigning the measurement gap for intra-frequency positioning measurements.

In one aspect, a user equipment (UE) capable of supporting location of the UE, includes an external interface configured to receive and send messages to entities in a wireless network; at least one memory; and at least one processor coupled to the external interface and the at least one memory, the at least one processor configured to: determine to use a measurement gap for intra-frequency positioning measurements outside a bandwidth part of the UE; send a message to a base station in the wireless network, via the external interface, requesting the measurement gap for intra-frequency positioning measurements; and receive a message from the base station, via the external interface, assigning the measurement gap for intra-frequency positioning measurements.

In one aspect, a user equipment (UE) capable of supporting location of the UE, includes a means for determining to use a measurement gap for intra-frequency positioning measurements outside a bandwidth part of the UE; a means for sending a message to a base station in a wireless network requesting the measurement gap for intra-frequency positioning measurements; and a means for receiving a message from the base station assigning the measurement gap for intra-frequency positioning measurements.

In one aspect, a non-transitory computer readable storage medium including program code stored thereon, the program code is operable to configure at least one processor in a user equipment (UE) capable of supporting location of the UE, includes program code to determine to use a measurement gap for intra-frequency positioning measurements outside a bandwidth part of the UE; program code to send a message to a base station in a wireless network requesting the measurement gap for intra-frequency positioning measurements; and program code to receive a message from the base station assigning the measurement gap for intra-frequency positioning measurements.

Figure 1:
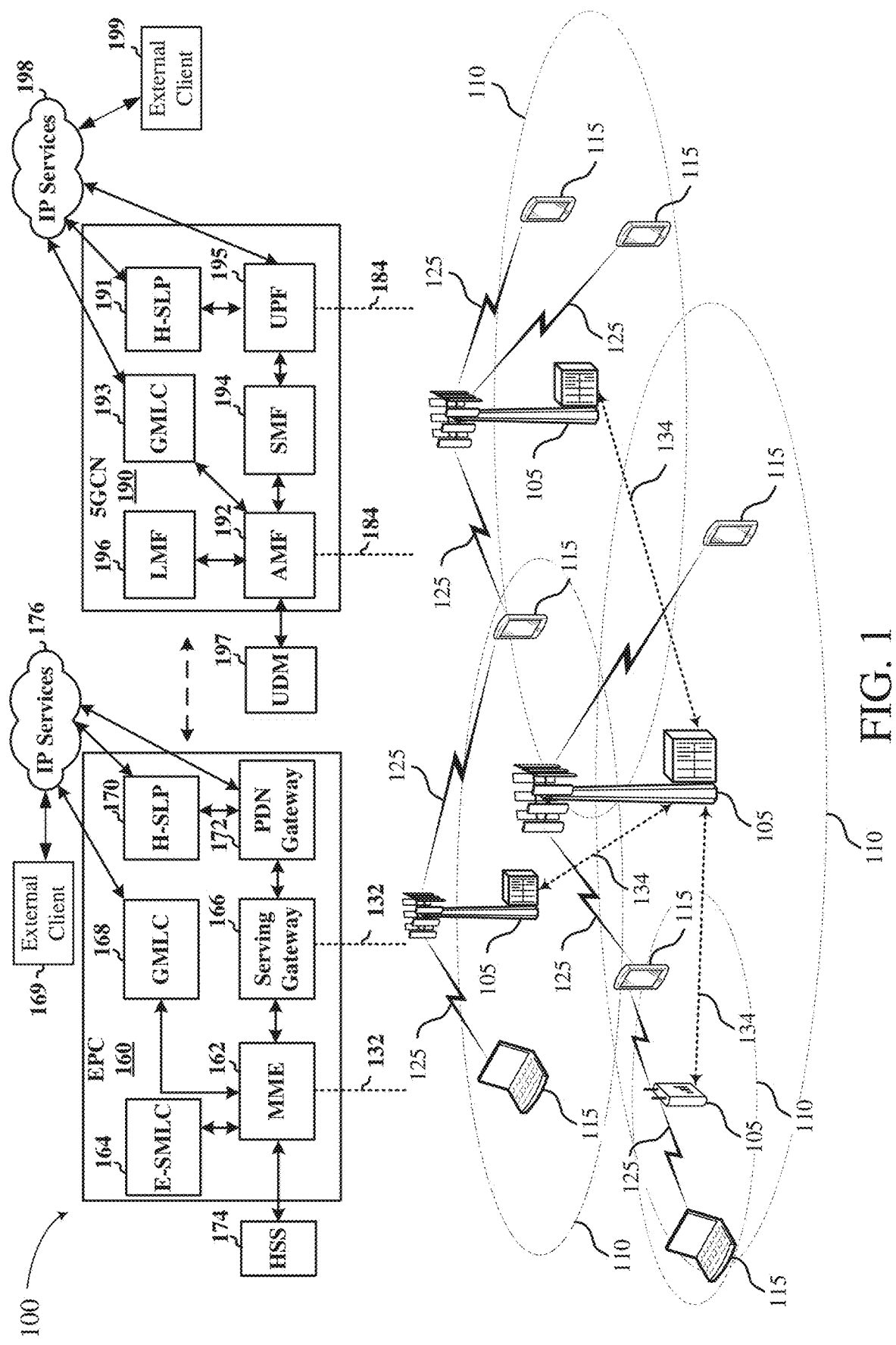
FIG. 1 is a diagram of an example wireless communications system to determine a position for a mobile device, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 105 may be indicated as 105-*a*, 105-*b*. When referring to such an element using only the first number, any instance of the element is to be understood (e.g. element 105 in the previous example may refer to elements 105-*a* and 105-*b*.

DETAILED DESCRIPTION

In location determination, such as Observed Time Difference of Arrival (OTDOA) based positioning, the UE may measure time differences in received signals from a plurality of base stations. Because positions of the base stations are known, the observed time differences may be used to calculate the location of the terminal. In OTDOA, the mobile station measures the time of arrival (TOA) of signals from a reference cell (e.g., the serving cell) and one or more neighboring cells. The TOA from the reference cell may be subtracted from the TOA from the one or more reference cells to determine the Reference Signal Time Difference (RSTD). Using the RSTD measurements, the absolute or relative transmission timing of each cell, and the known position(s) of the physical transmitting antennas for the reference and neighboring cells, the UE's position may be calculated.

Positioning Reference Signals (PRS) are broadcast by base stations and are used by UEs for positioning in wireless networks, such as a Long Term Evolution (LTE) network, and 5G NR networks, where the UE measures the TOA (Time of Arrival) metric of different cells and reports to the network/server. A PRS transmission may include a plurality of PRS resources in a PRS resource set, where each PRS resource is associated with a beam transmitted by the base station. The UE may choose to use a subset of the PRS resource set as a reference PRS resource or a neighbor (target) resource, where the subset may be more than one PRS resource. For example, the UE may choose to use a subset of PRS resources from a reference base station to produce a reference TOA for the RSTD measurement, e.g., the subset of PRS resources are used to produce a combined TOA for the reference base station. Similarly, the UE may choose to a subset of PRS resources from a neighbor (target) base station to produce a neighbor TOA for the RSTD measurement, e.g., the subset of PRS resources are used to produce a combined TOA for the neighbor base station.

A base station may transmit data, control information, and positioning signals, e.g., DL-PRS over a wideband spectrum. For example, New Radio (NR) networks support flexible channel bandwidth with, for example, a channel bandwidth that may vary between five (5) MHz and one hundred (100) MHz in FR1 and between fifty (50) MHz and four hundred (400) MHz in FR2, and may support scalable orthogonal frequency division multiple access (OFDMA) numerology. Frequency ranges, bandwidths, and additional information, may be found in, e.g., Third Generation Partnership Project (3GPP) Technical specification (TS) 38.101-1 and 3GPP TS 38.101-2. The wideband spectrum for NR networks can be divided into multiple non-overlapping sub-bands, where one or more sub-bands may be located in a bandwidth part (BWP) assigned to the UE. According to 3GPP TS 38.211 4.4.5, a carrier bandwidth part is defined as a contiguous set of physical resource blocks, selected from a contiguous subset of the common resource blocks for a given numerology(u) on a given carrier. During positioning measurements, however, it may be desirable for the UE to utilize more of the PRS spectrum than the assigned BWP.

In order for a user equipment (UE) to maintain connectivity and to facilitate positioning measurements outside of the BWP for the UE, the UE may be assigned a measurement gap. A measurement gap is a period of time in which the UE is allowed to or expected to tune elements of its receiver to frequencies outside the BWP. During a measurement gap, the UE may stop monitoring frequencies within its BWP, e.g., used for communications with the serving base station, and to monitor for positioning signals, e.g., PRS, at frequencies outside the BWP. In some implementations, during the measurement gap, the UE may stop monitoring only frequencies within the BWP and may monitor all available frequencies at which the positioning signals are transmitted, which may include frequencies within the BWP.

A measurement gap may be configured and assigned to a UE for performing positioning measurements outside the BWP based on several criteria. For example, a determination may be made to use a measurement gap for positioning measurements outside the UE BWP if the UE's current BWP part is less than the total available bandwidth for the positioning signals. If a first group of positioning signals that are in the BWP of the UE have a different numerology than a second group of positioning signals outside the BWP, and the second group has a greater bandwidth than the first group, it may be determined that a measurement gap should be assigned to the UE. The use of a measurement gap may be determined based on a minimum bandwidth or number of resource blocks or a minimum ratio of the current BWP (or number of resource blocks) to the total available bandwidth (or number of resource blocks) of the positioning signals is less than a predetermined threshold. The use of a measurement gap for positioning measurements outside the BWP may be determined based on a desired positioning accuracy. For example, the minimum bandwidth or number of resource blocks may be determined based on a desired positioned accuracy.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 illustrates an example of a wireless communications system 100 in accordance with one or more aspects of the present disclosure. The wireless communications system 100 includes base stations 105, UEs 115, and one or more core networks, illustrated as an Evolved Packet Core (EPC) 160 and a Fifth Generation Core (5GC) 190. While two core networks are shown the wireless communications system may use only one core network, e.g., the 5GC 190. In some examples, the wireless communications system 100 may be a Long Term Evolution (LTE) network, an LTE-Advanced (LTE-A) network, an LTE-A Pro network, or a New Radio (NR) network. In some examples, wireless communications system 100 may support measurement gaps for positioning measurements outside the UE BWP in accordance with various aspects of the present disclosure.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (for example, macro or small cell base stations). The UEs 115 described herein may be able to communicate with various types of base stations 105 and network equipment including macro eNBs, small cell eNBs, gNBs, relay base stations, and the like.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 105 provides an access point to the EPC 160 or 5GC 190 for a UE 115.

Examples of UEs 115 include a cellular phone, a smart phone, a session initiation protocol (SIP) phone, a laptop, a personal digital assistant (PDA), a satellite radio, a global positioning system, a multimedia device, a video device, a digital audio player (such as an MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 115 may be referred to as IoT devices (such as a parking meter, gas pump, toaster, vehicles, heart monitor, etc.). Some of the UEs 115 may be referred to as Industrial Internet of Things (IIoT) devices, such as sensors, instruments, and other devices networked together, in an industrial application. The UE 115 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Each base station 105 may be associated with a particular geographic coverage area 110 in which communications with various UEs 115 are supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink (UL) transmissions from a UE 115 to a base station 105, or downlink (DL) transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area 110 (for example, a sector) over which the logical entity operates.

Base stations 105 may communicate with the EPC 160 and/or 5GC 190 and with one another. For example, base stations 105 may interface with their respective core networks through backhaul links (for example, via an S1, N2, N3, or other interface). For example, eNB base stations 105 may interface with EPC 160 via backhaul links 132, while gNB base stations 105 may interface with 5GC 190 via backhaul links 184. Base stations 105 may communicate with one another over backhaul links 134 (for example, via an X2, Xn, or other interface) either directly (for example, directly between base stations 105) or indirectly (for example, via core network or intermediate base stations). The backhaul links 134 may be wired or may be wireless, as illustrated by backhaul link 134 to movable base station 105'.

The core networks 160/190 may provide user authentication, access authorization, tracking, Internet Protocol (IP) connectivity, and other access, routing, or mobility functions.

The EPC 160, by way of example, may include a Mobility Management Entity (MME) 162, an Enhanced Serving Mobile Location Center (E-SMLC) 164, a Serving Gateway 166, a Gateway Mobile Location Center (GMLC) 168, a Home Secure User Plane Location (SUPL) Location Platform (H-SLP) 170, and a Packet Data Network (PDN) Gateway 172. The MME 162 may be in communication with a Home Subscriber Server (HSS) 174. The MME 162 is the control node that processes the signaling between the UEs 115 and the EPC 160. Generally, the MME 162 provides bearer and connection management. The E-SMLC 164 may support location determination of the UEs, e.g., using the 3GPP control plane (CP) location solution. All user Internet protocol (IP) packets are transferred through the Serving Gateway 166, which itself is connected to the PDN Gateway 172. The PDN Gateway 172 provides UE IP address allocation as well as other functions. The PDN Gateway 172 is connected to the IP Services 176. The IP Services 176 may include the Internet, an intranet, an IP Multimedia Subsystem (IMS), a PS Streaming Service, and/or other IP services. The GMLC 168 may provide location access to the UE on behalf of external clients 169, e.g., that may be within or IP Services 176. The H-SLP 170 may support the SUPL User Plane (UP) location solution defined by the Open Mobile Alliance (OMA) and may support location services for UEs based on subscription information for the UEs stored in H-SLP 170.

The 5GC 190 may include an H-SLP 191, an Access and Mobility Management Function (AMF) 192, a Gateway Mobile Location Center (GMLC) 193, a Session Management Function (SMF) 194, and a User Plane Function (UPF) 195, a Location Management Function (LMF) 196. The AMF 192 may be in communication with a Unified Data Management (UDM) 197. The AMF 192 is the control node that processes the signaling between the UEs 115 and the 5GC 190 and which, for positioning functionality, may communicate with the LMF 196, which may support location determination of UEs. In some implementations, the LMF 196 may be co-located with a base station 105 in the NG-RAN and may be referred to as a Location Management Component (LMC). The GMLC 193 may be used to allow an external client 199, outside or within IP Services 198, to receive location information regarding the UEs. All user Internet protocol (IP) packets may be transferred through the UPF 195. The UPF 195 provides UE IP address allocation as well as other functions. The UPF 195 is connected to the IP Services 198. The H-SLP 191 may likewise be connected to the IP Services 198. The IP Services 198 may include the Internet, an intranet, an IP Multimedia Subsystem (IMS), a PS Streaming Service, and/or other IP services.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (for example, radio heads and access network controllers) or consolidated into a single network device (for example, a base station 105).

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an machine type communication (MTC) device or the like, which may be implemented in various articles such as appliances, vehicles, meters, or the like.

In some examples, the base stations 105 may transmit one or more additional downlink reference signals for communication, including a positioning reference signal (PRS) transmission. The PRS transmission may be configured for a specific UE 115 to measure and report one or more report parameters (for example, report quantities) associated with positioning and location information. A base station 105 may use the reported information as part of a UE-assisted positioning technique. The PRS transmission and report parameter feedback may support various location services (for example, navigation systems, emergency communications). In some examples, the report parameters supplement one or more additional location systems supported by the UE 115 (such as global positioning system (GPS) technology).

A base station 105 may configure a PRS transmission on one or more PRS resources of a channel A PRS resource may span resource elements of multiple physical resource blocks (PRBs) within one or more OFDM symbols of a slot depending on a configured number of ports. For example, a PRS resource may span one symbol of a slot and contain one port for transmission. In any OFDM symbol, the PRS resources may occupy consecutive PRBs. In some examples, the PRS transmission may be mapped to consecutive OFDM symbols of the slot. In other examples, the PRS transmission may be mapped to interspersed OFDM symbols of the slot. Additionally, the PRS transmission may support frequency hopping within PRBs of the channel.

The one or more PRS resources may span a number of PRS resource sets according to a PRS resource setting of the base station 105. The structure of the one or more PRS resources, PRS resource sets, and PRS resource settings within a PRS transmission may be referred to as a multi-level resource setting. For example, multi-level PRS resource setting of the base station 105 may include multiple PRS resource sets and each PRS resource set may contain a set of PRS resources (such as a set of 4 PRS resources).

The UE 115 may receive the PRS transmission over the one or more PRS resources of the slot. The UE 115 may determine a report parameter for at least some of if not each PRS resource included in the transmission. The report parameter (which may include a report quantity) for each PRS resource may include one or more of a time of arrival (TOA), a reference signal time difference (RSTD), a reference signal receive power (RSRP), an angle, a PRS identification number, a reception to transmission difference (UE Rx-Tx), a signal-to-noise ratio (SNR), or a reference signal receive quality (RSRQ).

Wireless communications system 100 may be or include a multicarrier beamformed communication system, such as a mmW wireless communication system. Aspects of wireless communications system 100 may include use of PRS transmissions by the base station 105 or sounding reference signal (SRS) transmissions by the UE 115 for UE location determination. For downlink-based UE location determination, a location server 164/196, e.g., LMF 196 in a NR network or E-SMLC 164 in LTE (sometimes referred to as location server 164/196), may be used to provide PRS assistance data (AD) to the UE 115. In UE-assisted positioning, the location server may receive measurement reports from the UE 115 that indicates position measurements for one or multiple base stations 105 with which location server may determine a position estimate for the UE 115, e.g., using OTDOA, or other desired techniques.

New radio (NR) networks support flexible channel bandwidth design for both a network and a UE. A set of channel bandwidths may be determined based on the band frequency (e.g., center frequency) and subcarrier spacing (SCS). A bandwidth may include one or more bandwidth parts (BWPs). Therefore, each BWP may be configured with a specific numerology, such as SCS and cyclic prefix (CP), a band frequency, and a bandwidth. A BWP may include one or more physical resource blocks (PRBs). The PRBs in a BWP may be contiguous reserved resources. Compared with carrier aggregation (CA), the configuration of BWP is more flexible and reliable for diverse UE categories and requirements. For example, different UEs that have different processing capabilities may be allocated with different BWPs with different SCSs. In other words, the configuration of BWP may be UE-specific. Also, the configuration of BWP for downlink and uplink can be different.

Figure 2:
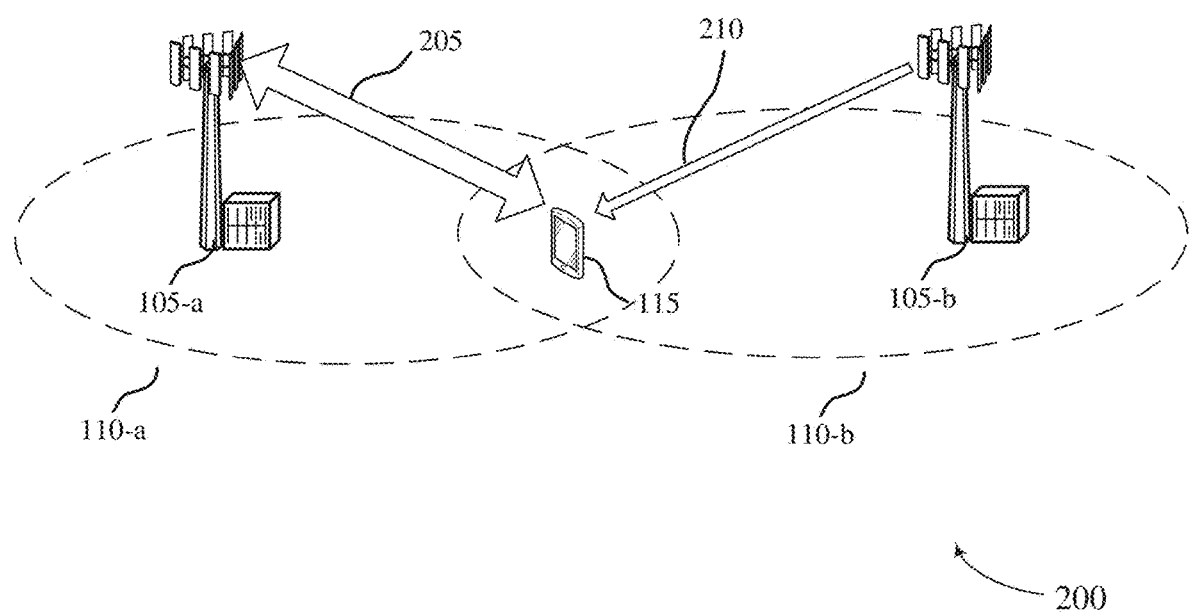
FIG. 2 illustrates an example of a wireless communications system capable of configuring a UE with a measurement gap for performing positioning measurements outside the BWP of the UE.

FIG. 2 illustrates an example of a wireless communications system 200 capable of configuring a UE with a measurement gap for performing positioning measurements outside the BWP of the UE in accordance with various aspects of the present disclosure. Specifically, wireless communications system 200 may include a UE 115, which may be assigned a measurement gap for measurement of positioning signals, e.g., PRS signals, that are outside the BWP of the UE 115. UE 115, base station 105-a and base station 105-b may be examples of corresponding devices described with reference to FIG. 1.

UE 115 may communicate 205 with base station 105-a, which operates as the serving base station for UE 115, but may also receive positioning signals 210 from neighboring base station 105-b. The UE 115 is configured to communicate with serving base station 105-a using a downlink BWP, which is less than the full wideband spectrum utilized by the serving base station 105-a. The UE 115 receives positioning signals, e.g., DL PRS signals, from serving base station 105-a and neighboring base station 105-b. The DL PRS configuration provided to the UE is independent of the configured DL BWP of the UE.

Figure 3:
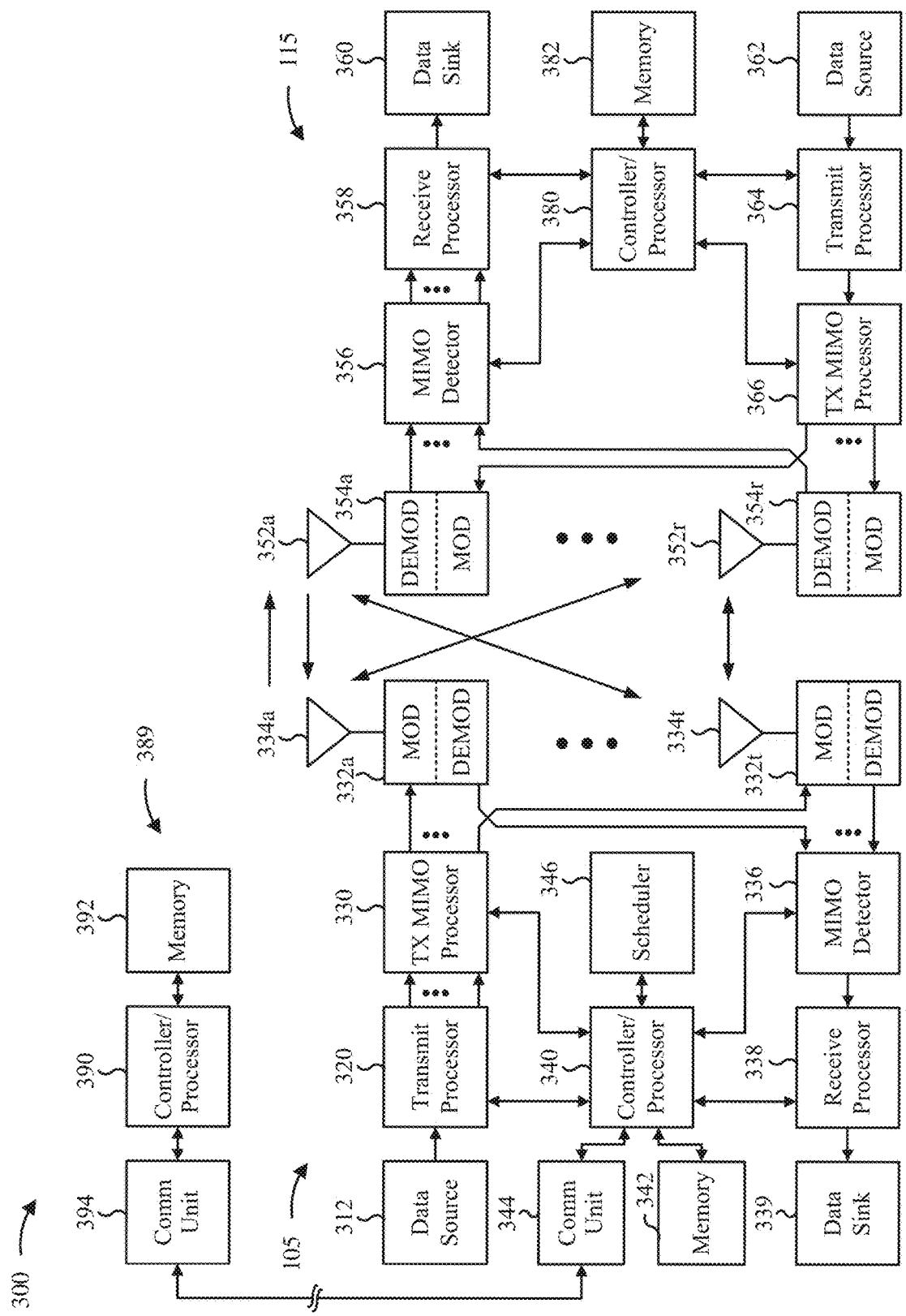
FIG. 3 illustrates a block diagram of a design of base station and user equipment (UE), which may be one of the base stations and one of the UEs in FIG. 1.

FIG. 3 shows a block diagram of a design 300 of base station 105 and UE 115, which may be one of the base stations and one of the UEs in FIG. 1. Base station 105 may be equipped with T antennas 334a through 334t, and UE 115 may be equipped with R antennas 352a through 352r, where in general T≥1 and R≥1.

At base station 105, a transmit processor 320 may receive data from a data source 312 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 320 may also process system information (e.g., for semi-static resource partitioning information (SRPI) and/or the like) and control information (e.g., CQI requests, grants, upper layer signaling, and/or the like) and provide overhead symbols and control symbols. Transmit processor 320 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 330 may perform spatial processing (e.g., precoding) on the data symbols, the control symbols, the overhead symbols, and/or the reference symbols, if applicable, and may provide T output symbol streams to T modulators (MODs) 332a through 332t. Each modulator 332 may process a respective output symbol stream (e.g., for OFDM and/or the like) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively. According to various aspects described in more detail below, the synchronization signals can be generated with location encoding to convey additional information.

At UE 115, antennas 352a through 352r may receive the downlink signals from base station 105 and/or other base stations and may provide received signals to demodulators (DEMODs) 354a through 354r, respectively. Each demodulator 354 may condition (e.g., filter, amplify, down convert, and digitize) a received signal to obtain input samples. Each demodulator 354 may further process the input samples (e.g., for OFDM and/or the like) to obtain received symbols. A MIMO detector 356 may obtain received symbols from all R demodulators 354a through 354r, perform MIMO detection on the received symbols if applicable, and provide detected symbols. A receive processor 358 may process (e.g., demodulate and decode) the detected symbols, provide decoded data for UE 115 to a data sink 360, and provide decoded control information and system information to a controller/processor 380. A channel processor may determine reference signal received power (RSRP), received signal strength indicator (RSSI), reference signal received quality (RSRQ), channel quality indicator (CQI), and/or the like. In some aspects, one or more components of UE 115 may be included in a housing.

On the uplink, at UE 115, a transmit processor 364 may receive and process data from a data source 362 and control information (e.g., for reports comprising RSRP, RSSI, RSRQ, CQI, and/or the like) from controller/processor 380. Transmit processor 364 may also generate reference symbols for one or more reference signals. The symbols from transmit processor 364 may be precoded by a TX MIMO processor 366 if applicable, further processed by modulators 354a through 354r (e.g., for DFT-s-OFDM, CP-OFDM, and/or the like), and transmitted to base station 105. At base station 105, the uplink signals from UE 115 and other UEs may be received by antennas 334, processed by demodulators 332, detected by a MIMO detector 336 if applicable, and further processed by a receive processor 338 to obtain decoded data and control information sent by UE 115. Receive processor 338 may provide the decoded data to a data sink 339 and the decoded control information to controller/processor 340. Base station 105 may include communication unit 344 and communicate to network controller 389 via communication unit 344. Network controller 389 may include communication unit 394, controller/processor 390, and memory 392.

Controller/processor 340 of base station 105, controller/processor 380 of UE 115, and/or any other component(s) of FIG. 3 may perform one or more techniques associated configuring a measurement gap for performing positioning measurements outside the BWP of the UE, as described in more detail elsewhere herein. For example, controller/processor 340 of base station 105, controller/processor 380 of UE 115, and/or any other component(s) of FIG. 3 may perform or direct operations of, for example, process 600 of FIG. 6 or process 700 of FIG. 7, and/or other processes as described herein. Memories 342 and 382 may store data and program codes for base station 105 and UE 115, respectively. In some aspects, memory 342 and/or memory 382 may comprise a non-transitory computer-readable medium storing one or more instructions for wireless communication. For example, the one or more instructions, when executed by one or more processors of the base station 105 and/or the UE 115, may perform or direct operations of, for example, process 600 of FIG. 6 or process 700 of FIG. 7, and/or other processes as described herein. A scheduler 346 may schedule UEs for data transmission on the downlink and/or uplink.

As indicated above, FIG. 3 is provided as an example. Other examples may differ from what is described with regard to FIG. 3.

Figure 4A:
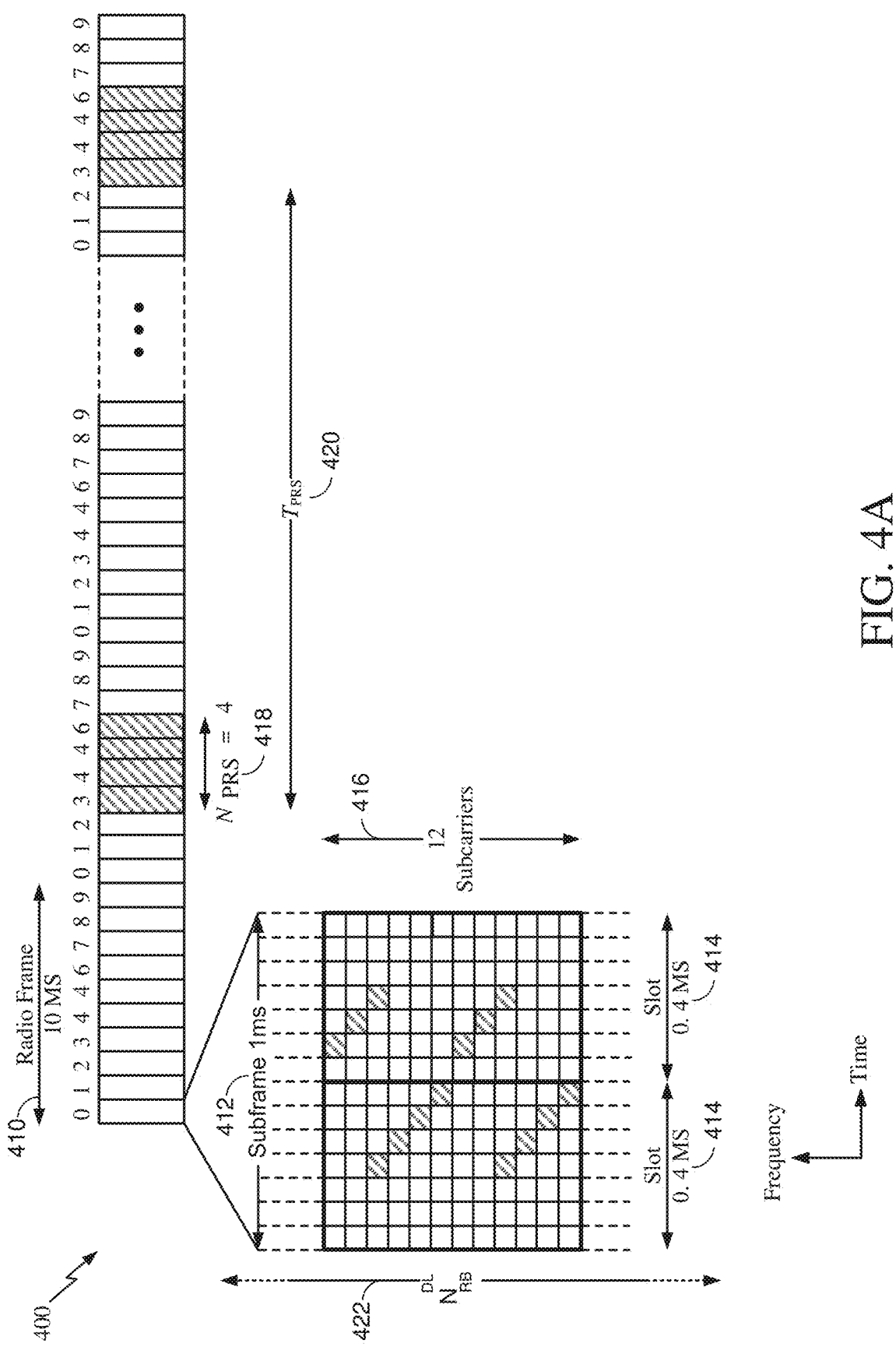
FIG. 4A is a diagram of a structure of an exemplary subframe sequence with positioning reference signal (PRS) positioning occasions.

FIG. 4A shows a structure of an exemplary subframe sequence 400 with positioning reference signal (PRS) positioning occasions, according to aspects of the disclosure. Subframe sequence 400 may be applicable to the broadcast of PRS signals from a base station (e.g., any of the base stations described herein) or other network node. The subframe sequence 400 may be used in LTE systems, and the same or similar subframe sequence may be used in other communication technologies/protocols, such as 5G and NR. In FIG. 4A, time is represented horizontally (e.g., on the X axis) with time increasing from left to right, while frequency is represented vertically (e.g., on the Y axis) with frequency increasing (or decreasing) from bottom to top. As shown in FIG. 4A, downlink and uplink radio frames 410 may be of 10 millisecond (ms) duration each. For downlink frequency division duplex (FDD) mode, radio frames 410 are organized, in the illustrated example, into ten subframes 412 of 1 ms duration each. Each subframe 412 comprises two slots 414, each of, for example, 0.5 ms duration.

In the frequency domain, the available bandwidth may be divided into uniformly spaced orthogonal subcarriers 416 (also referred to as "tones" or "bins"). For example, for a normal length cyclic prefix (CP) using, for example, 15 kHz spacing, subcarriers 416 may be grouped into a group of twelve (12) subcarriers. A resource of one OFDM symbol length in the time domain and one subcarrier in the frequency domain (represented as a block of subframe 412) is referred to as a resource element (RE). Each grouping of the 12 subcarriers 416 and the 14 OFDM symbols is termed a resource block (RB) and, in the example above, the number of subcarriers in the resource block may be written as $N_{SC}^{RB}=12$. For a given channel bandwidth, the number of available resource blocks on each channel 422, which is also called the transmission bandwidth configuration 422, is indicated as $N_{RB}^{DL}$. For example, for a 3 MHz channel bandwidth in the above example, the number of available resource blocks on each channel 422 is given by $N_{RB}^{DL}=15$. Note that the frequency component of a resource block (e.g., the 12 subcarriers) is referred to as a physical resource block (PRB).

A base station may transmit radio frames (e.g., radio frames 410), or other physical layer signaling sequences, supporting PRS signals (i.e. a downlink (DL) PRS) according to frame configurations either similar to, or the same as that, shown in FIG. 4A, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 4A.

A collection of resource elements that are used for transmission of PRS signals is referred to as a "PRS resource." The collection of resource elements can span multiple PRBs in the frequency domain and N (e.g., 1 or more) consecutive symbol(s) within a slot 414 in the time domain. For example, the cross-hatched resource elements in the slots 414 may be examples of two PRS resources. A "PRS resource set" is a set of PRS resources used for the transmission of PRS signals, where each PRS resource has a PRS resource identifier (ID). In addition, the PRS resources in a PRS resource set are associated with the same transmission-reception point (TRP). A PRS resource ID in a PRS resource set is associated with a single beam transmitted from a single TRP (where a TRP may transmit one or more beams). Note that this does not have any implications on whether the TRPs and beams from which signals are transmitted are known to the UE.

PRS may be transmitted in special positioning subframes that are grouped into positioning occasions. A PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number $N_{PRS}$ of consecutive positioning subframes. The PRS positioning occasions for a cell supported by a base station may occur periodically at intervals, denoted by a number $T_{PRS}$ of milliseconds or subframes. As an example, FIG. 4A illustrates a periodicity of positioning occasions where $N_{PRS}$ equals 4 418 and $T_{PRS}$ is greater than or equal to 20 420. In some aspects, $T_{PRS}$ may be measured in terms of the number of subframes between the start of consecutive positioning occasions. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a $j^{th}$ positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to the UE to enable the UE to perform PRS positioning measurements. The UE is not expected to blindly perform detection of PRS configurations.

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS signals in LTE, navigation reference signals (NRS), transmitter reference signals (TRS), cell-specific reference signals (CRS), channel state information reference signals (CSI-RS), primary synchronization signals (PSS), secondary synchronization signals (SSS), etc.

Similar to DL PRS transmitted by base stations, discussed above, a UE 104 may transmit UL PRS for positioning. The UL PRS may be sometimes referred to as sounding reference signals (SRS) for positioning. Using received DL PRS from base stations and/or UL PRS transmitted to base stations, the UE may perform various positioning methods, such as time of arrival (TOA), reference signal time difference (RSTD), time difference of arrival (TDOA), reference signal received power (RSRP), time difference between reception and transmission of signals (Rx-Tx), Angle of Arrival (AoA) or Angle of Departure (AoD), etc. In some implementations, the DL PRS and UL PRS are received and transmitted jointly to perform Round Trip Time (RTT) positioning measurements with one or multiple base stations (multi-RTT).

Figure 4B:
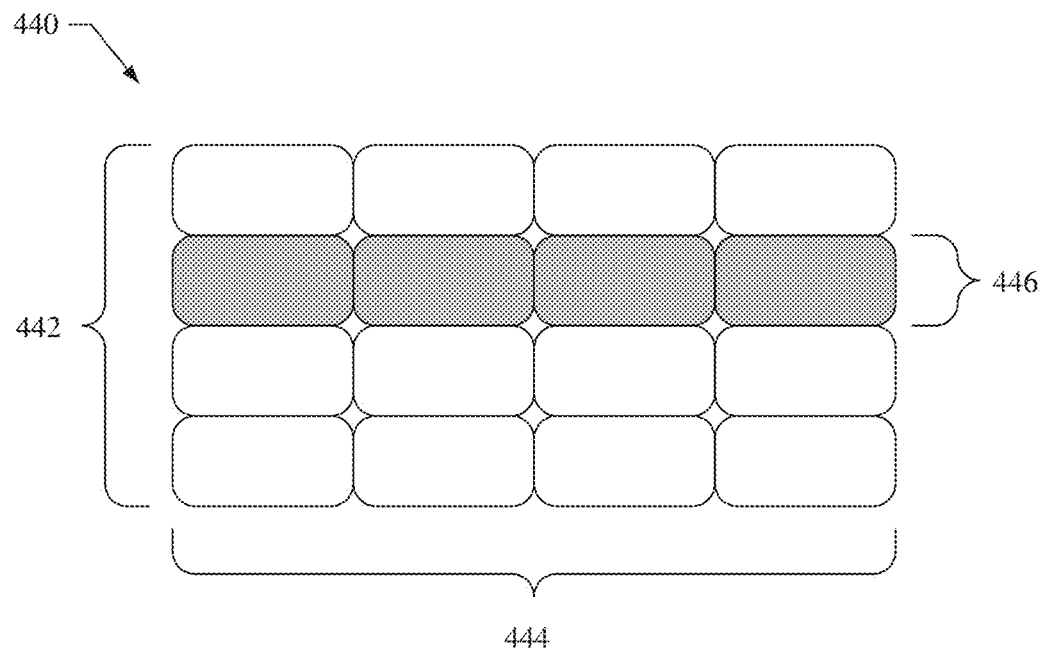
FIG. 4B illustrates an example of downlink positioning signals with uniform numerology transmitted and the DL BWP of the UE.

FIG. 4B illustrates an example of downlink positioning signals 440, such as DL PRS signals, with uniform numerology transmitted by a base station, e.g., base station 105-a. The downlink positioning signals 440 include a wideband spectrum that is divided into multiple non-overlapping frequency sub-bands 442, shown on the vertical frequency axis, which are transmitted over time as multiple symbols 444, shown on the horizontal time axis. A resource block may be defined as 12 contiguous sub-carriers for 1 slot (12 or 14 symbols). From 3GPP TS 38.211 Ch 4.4.5, there can be up to 4 BWPs defined per UE, but only one BWP can be active at any given point in time. Thus, as illustrated in FIG. 4B, a UE, e.g., UE 115, may be assigned an active DL BWP 446, which is less than the available bandwidth of the downlink positioning signals 440, and is illustrated as being one of the sub-bands 442. FIG. 4B illustrates the active DL BWP 446 as 25% of the available bandwidth of the downlink positioning signal 440, but the DL BWP 446 may be a smaller or larger percentage of the bandwidth of the downlink positioning reference signal 440.

Figure 4C:
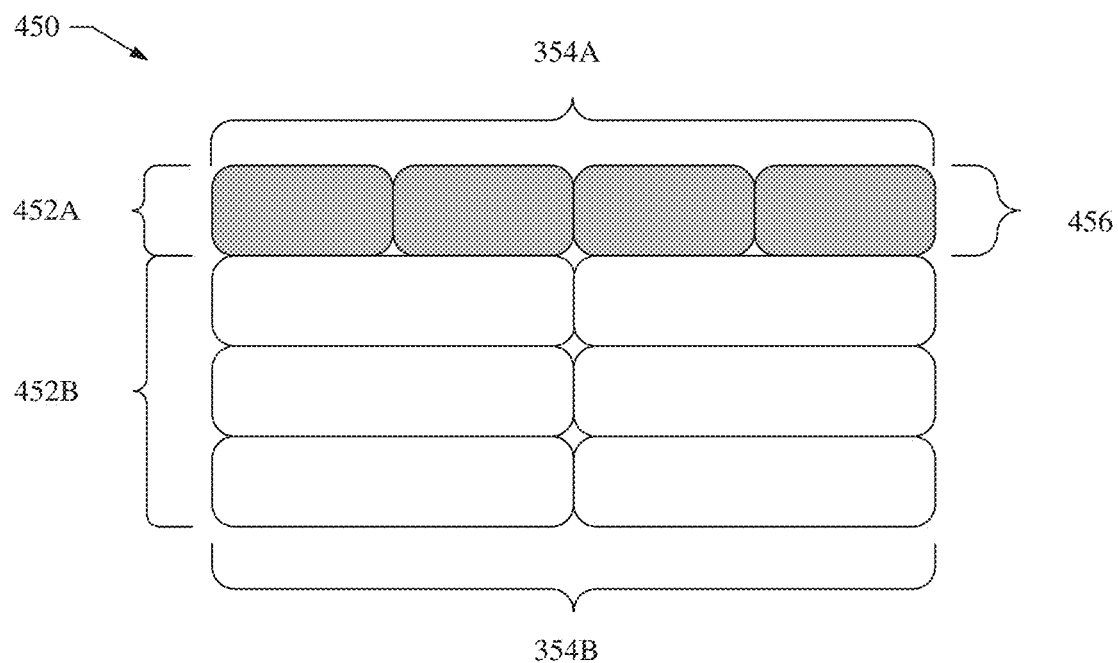
FIG. 4C illustrates an example of downlink positioning signals with mixed numerology transmitted and the DL BWP of the UE.

FIG. 4C illustrates another example of downlink positioning signals 450, such as DL PRS signals, with mixed, i.e., non-uniform, numerology transmitted by a base station, e.g., base station 105-a. Similar to downlink positioning signals 400, downlink positioning signals 450 include a wideband spectrum that is divided into multiple non-overlapping frequency sub-bands, shown on the vertical frequency axis, which are transmitted over time as multiple symbols, shown on the horizontal time axis. As illustrated in FIG. 4C, however, downlink positioning signals 450 include a first group 452A of positioning signals having a first numerology, illustrated by the length of symbols 454A, and a second group 452B of positioning signals having a second numerology, illustrated by the length of symbols 454B, that is different than the numerology of the first group 452A. Moreover, as illustrated, the first group 452A of positioning signals have a different, e.g., smaller, bandwidth than the second group 452B of positioning signals. A UE, e.g., UE 115, may be assigned an active DL BWP in one or the other group 452A, 452B, and as illustrated in FIG. 4C, is assigned an active DL BWP 456 that is in the first group 452A.

For intra-frequency measurements, when the UE 115 is not configured with a measurement gap, the UE 115 only measures positioning signals, e.g., DL PRS, from the base stations 105-a and 105-b that are within the active DL BWP and that have the same numerology as the active DL BWP. For intra-frequency measurements, when configured with a measurement gap, however, the UE 115 may measure positioning signals, e.g., DL PRS, from the base stations 105-a and 105-b that are outside the active DL BWP or that have a different numerology from the numerology of the active DL BWP. Thus, for intra-frequency measurements the positioning measurement performed by the UE 115 may be within the DL BWP configuration when the UE 115 is not configured with a measurement gap, or may be outside the DL BWP configuration when the UE 115 is configured with a measurement gap. When measurement gaps are configured, the UE 115 may be expected to measure the positioning signals outside the configured (active and inactive) BWP, but the UE 115 may measure only on a part of the part of the positioning signals configured bandwidth, as long as measurement requirements are met. The use of additional bandwidth, e.g., bandwidth that is outside the current DL BWP, for intra-frequency positioning measurements may be useful, e.g., to improve signal to noise ratio (SNR) and/or to produce a more narrow correlation peak to improve estimation of time of arrival.

A base station, such as serving base station 105-a, the UE 115, or a location server, e.g., location server 164/196 in FIG. 1, may determine whether to configure UE 115 with a measurement gap for performing positioning measurements outside the BWP. The determination to configure a measurement gap may be made, e.g., after a location request or during initialization with the base station. Moreover, once a determination is made to assign a measurement gap to the UE 115, the measurement gap configuration may be for one or more positioning occasions, e.g., periods when DL-PRS is transmitted. For example, the measurement gap configuration may be valid for a single location request or may be persistent, e.g., valid for one or more subsequent positioning occasions.

The determination to configure a UE with a measurement gap for performing positioning measurements outside the BWP may be based on several criteria. For example, an entity, such as the base station, UE or location server may determine that the UE should be configured with a measurement gap for intra-frequency positioning measurements outside the DL BWP if the UE's current DL BWP is less than the total available bandwidth for the positioning signals. For example, the serving base station, or location server, may make this determination as these entities may be aware of the UE's current DL BWP and may determine if the DL BWP is less than the available bandwidth for positioning signals. The UE may similarly make such a determination if the total available bandwidth for positioning signals is provided to the UE, e.g., in a positioning assistance data.

In another example, an entity, such as the base station, UE or location server may determine that the UE should be configured with a measurement gap for intra-frequency positioning measurements outside the DL BWP if a first group of positioning signals that are in the DL BWP of the UE has a different numerology than a second group of positioning signals and the first group of positioning signals has a bandwidth that is less than a bandwidth of the second group of positioning signals. For example, the serving base station, or location server, may make this determination as these entities may be aware of the UE's current DL BWP and may determine if a first group of positioning signals that are in the DL BWP has a different numerology than a second group of positioning signals and the first group of positioning signals has a bandwidth that is less than a bandwidth of the second group of positioning signals. The UE may similarly make such a determination if the total available bandwidth for positioning signals is provided to the UE, e.g., in a positioning assistance data.

In another example, an entity, such as the base station, UE or location server may determine that the UE should be configured with a measurement gap for intra-frequency positioning measurements outside the DL BWP if a number of resource blocks, e.g., PRBs, for the DL BWP of the UE is less than a minimum number of resource blocks required by the UE for positioning measurements. By way of example, the UE may have a minimum number of resource blocks required for positioning measurements, e.g., at least 48 resource blocks may be required for positioning measurements. If the current DL BWP has fewer resource blocks, e.g., the current DL BWP may provide only 24 resource blocks, then a measurement gap for intra-frequency positioning measurements outside the DL BWP may be used. For example, the UE may make this determination as it may be aware of the minimum number of resource blocks required by the UE for positioning measurements and the number of resource blocks available in the current DL BWP. The serving base station or location server may similarly make such a determination if the minimum number of resource blocks required by the UE for positioning measurements is provided to the serving base station or location server, e.g., in a provide capabilities message.

In another example, an entity, such as the base station, UE or location server may determine that the UE should be configured with a measurement gap for intra-frequency positioning measurements outside the DL BWP if the BWP of the UE is less than a minimum fraction of a total available bandwidth of the positioning signals. For example, it may be determined whether a ratio of the DL BWP of the UE to the total available bandwidth of positioning signals is less than a predetermined threshold. In another example, it may be determined whether a ratio of a number of resource blocks for the DL BWP of the UE to a number of resource blocks for the total available bandwidth of positioning signals is less than a predetermined threshold. For example, if the number of resource blocks for the total available bandwidth of positioning signals is 272 and the number of resource blocks for the DL BWP is 24, and the predetermined threshold is 0.5, the ratio of the number of resource blocks for the DL BWP of the UE to the number of resource blocks for the total available bandwidth of positioning signals (24/272=0.0882) is less than the predetermined threshold of 0.5, then a measurement gap for intra-frequency positioning measurements outside the DL BWP may be used. For example, the serving base station, or location server, may make this determination as these entities may be aware of the number of resource blocks for the DL BWP and the number of resource blocks for the total available bandwidth of positioning signals. The UE may similarly make such a determination as it may be aware of the number of resource blocks for the DL BWP and the number of resource blocks for the total available bandwidth of positioning signals are provided, e.g., if provided in an positioning assistance data message.

In another example, an entity, such as the base station, UE or location server may determine that the UE should be configured with a measurement gap for intra-frequency positioning measurements outside the DL BWP based on a desired positioning accuracy of the UE. The desired positioning accuracy may be a function of the bandwidth used for measuring positioning signals. A look up table may provide the bandwidth used for measuring positioning signals as a function of desired positioning accuracy. For example, it may be determined whether the DL BWP of the UE is less than a minimum bandwidth of positioning signals needed to produce the desired positioning accuracy. In another example, it may be determined whether a number of resource blocks for the DL BWP of the UE is less than a minimum number of resource blocks needed to produce the desired positioning accuracy. By way of example, for a desired positioning accuracy of 20 m, the minimum number of resource blocks used for measuring the positioning signals may be 120, while the number of resource blocks for the DL BWP may be 24, and a measurement gap for intra-frequency positioning measurements outside the DL BWP may be used. The UE may make this determination as it may be aware of the desired positioning accuracy, e.g., the minimum bandwidth of positioning signals or resource blocks needed to produce the desired positioning accuracy and the bandwidth or number of resource blocks available in the current DL BWP. The serving base station or location server may similarly make such a determination if the desired positioning accuracy, e.g., the minimum bandwidth of positioning signals or resource blocks needed to produce the desired positioning accuracy and the bandwidth or number of resource blocks available in the current DL BWP, is provided to the serving base station or location server, e.g., in a provide capabilities message.

Figure 5A:
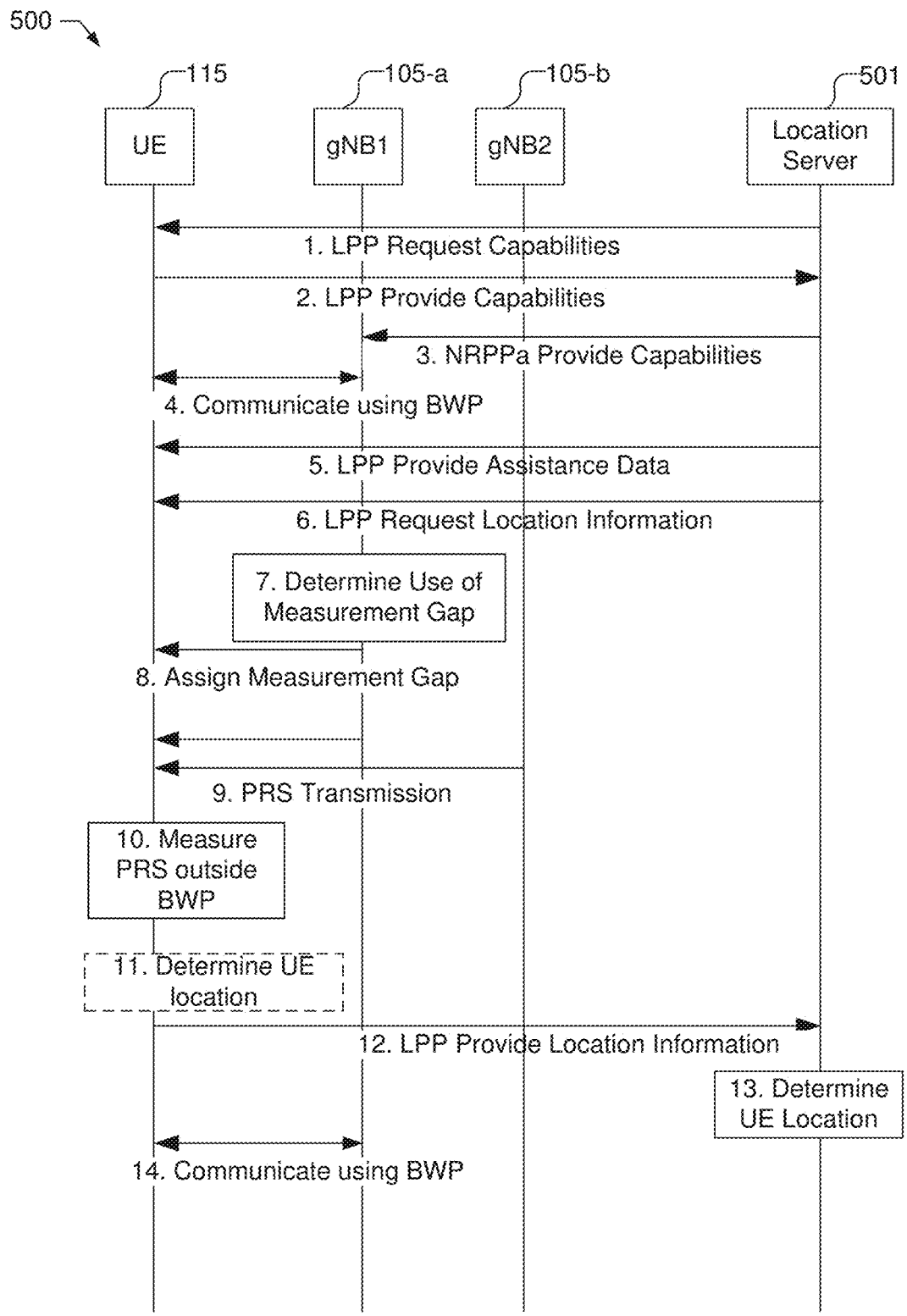
FIG. 5A shows a signaling flow that illustrates various messages sent during a location session and to determine to use a measurement gap for performing positioning measurements outside the BWP of the UE by the serving base station.

FIG. 5A shows a signaling flow 500 that illustrates various messages sent between components of the communication system 100 depicted in FIGS. 1 and 2, during a location session and to configure a measurement gap for performing positioning measurements outside the BWP of the UE. FIG. 5A illustrates a procedure for a determination by the serving base station 105-a to use a measurement gap for intra-frequency positioning measurements outside the DL BWP of the UE 115. If desired, the determination may be made by the location server 501, such as location server 164/196 shown in FIG. 1, using appropriate signaling messages.

While the flow diagram 500 is discussed, for ease of illustration, in relation to a 5G NR wireless access using gNBs 105, signaling flows similar to FIG. 5A involving ng-eNBs or eNBs rather than gNBs 105 will be readily apparent to those with ordinary skill in the art. Location server 501 may be, e.g., an LMF 196 for a 5G NR network, or a Secure User Plane Location (SUPL) Location Platform (SLP) 170 or E-SMLC 164 in LTE. Furthermore, in some embodiments, the UE 115 itself may be configured to determine its location using, for example, assistance data provided to it. In the signaling flow 500, it is assumed that the UE 115 and location server 501 communicate using the LPP positioning protocol referred to earlier, although use of NPP or a combination of LPP and NPP is also possible.

At stage 1, the location server 501 sends an LPP Request Capabilities message to the UE 115, e.g., to request the positioning capabilities of the UE 115.

At stage 2, the UE 115 returns an LPP Provide Capabilities message to the location server 501 to provide the positioning capabilities of the UE 115. The positioning capabilities may include, e.g., the minimum number of resource blocks required by the UE 115 for positioning measurements or a desired positioning accuracy, which may be provided to the serving base station 105-a.

At stage 3, the location server 501 sends an NRPPa Provide Capabilities message to the serving gNBs 105-a that includes, e.g., the minimum number of resource blocks required by the UE 115 for positioning measurements or a desired positioning accuracy if provided at stage 2. If the location server 501 determines whether to use a measurement gap for intra-frequency positioning measurements outside the DL BWP of the UE 115 then stage 3 is not necessary.

At stage 4, the UE 115 communicates with the serving gNB 105-a, using a configured DL bandwidth part (BWP) and UL BWP if assigned. The UE 115 may be configured with the DL BWP including a specific numerology, such as SCS and CP, a band frequency, and a bandwidth in a previous message, not shown.

At stage 5, the location server 501 may send an LPP Provide Assistance Data message to the UE 115 to provide positioning assistance data to assist the UE 115 to acquire and measure the PRS signals and optionally determine a location from the PRS measurements.

At stage 6, the location server 501 sends an LPP Request Location Information message to the UE 115 to request the UE 115 to measure DL PRS transmission by the gNBs 105. For example, the location server 501 may request measurements of RSTD if OTDOA is used. The location server 501 may also indicate whether UE based positioning is requested whereby the UE 115 determines its own location. In some implementations, the location server 501 may also include in the LPP Request Location Information message a request for location measurements for other position methods which do not use PRS (e.g. WiFi positioning or A-GNSS positioning).

At stage 7, the serving base station 105-*a* determines whether to configure the UE 115 with a measurement gap for intra-frequency positioning measurements outside the DL BWP of the UE 115. As discussed above, the serving base station 105-*a* may determine whether to configure the UE 115 with a measurement gap for intra-frequency positioning measurements outside the DL BWP of the UE 115 based on several criteria including if the DL BWP of the UE 115 is less than the total available bandwidth for DL PRS transmitted by the gNBs 105, if a first group of DL PRS that are in the DL BWP has a different numerology than a second group of DL PRS signals and the first group has a bandwidth that is less than a bandwidth of the second group, if a number of resource blocks for the DL BWP is less than a minimum number of resource blocks required by the UE 115 for positioning measurements (e.g., as obtained at stage 3), if the DL BWP is less than a minimum fraction of a total available bandwidth of the DL PRS signals, and based on a desired positioning accuracy of the UE 115 (e.g., as obtained at stage 3). The determination of whether to configure the UE 115 with a measurement gap for intra-frequency positioning measurements outside the DL BWP of the UE 115 may be performed in response to the location request at stage 6 or may be performed at an earlier time, e.g., during initialization between the UE 115 and serving base station 105-*a*, and thus, stage 7 may occur prior to stage 6.

At stage 8, the location server 501 assigns a measurement gap for intra-frequency positioning measurements outside the DL BWP of the UE 115 and provides the configuration of the measurement gap to the UE 115, e.g., via RRC.

At stage 9, the gNBs 105 transmit DL PRS signals using the full available bandwidth.

At stage 10, the UE 115 may tune its receiver to frequencies outside the DL BWP and to acquire and measure the DL PRS transmitted by the gNBs 105 at stage 9 using frequencies outside the DL BWP of the UE 115. The UE 115, for example, may obtain RSTD measurements when OTDOA is used, TOA or Rx-Rx measurements when RTT is used, or AOA or AOD measurements when AOA or AOD is used. The UE 115 may also obtain other non-PRS measurements in addition of requested at stage 6.

At stage 11, if UE 115 based positioning was requested at stage 6, the UE 115 determines its location based on the PRS measurements (and any other measurements) obtained at stage 10 and the assistance data received at stage 5.

At stage 12, the UE 115 sends an LPP Provide Location Information message to the location server 501 and includes the PRS measurements (and any other measurements) obtained at stage 10 or the UE location obtained at stage 11.

At stage 13, the location server 501 determines the UE location based on any PRS measurements (and any other measurements) received at stage 12 or may verify a UE location received at stage 12.

At stage 14, the UE 115 may tune its receiver to frequencies within the DL BWP and communicate with the serving gNB 105-*a*, using the configured DL BWP.

Figure 5B:
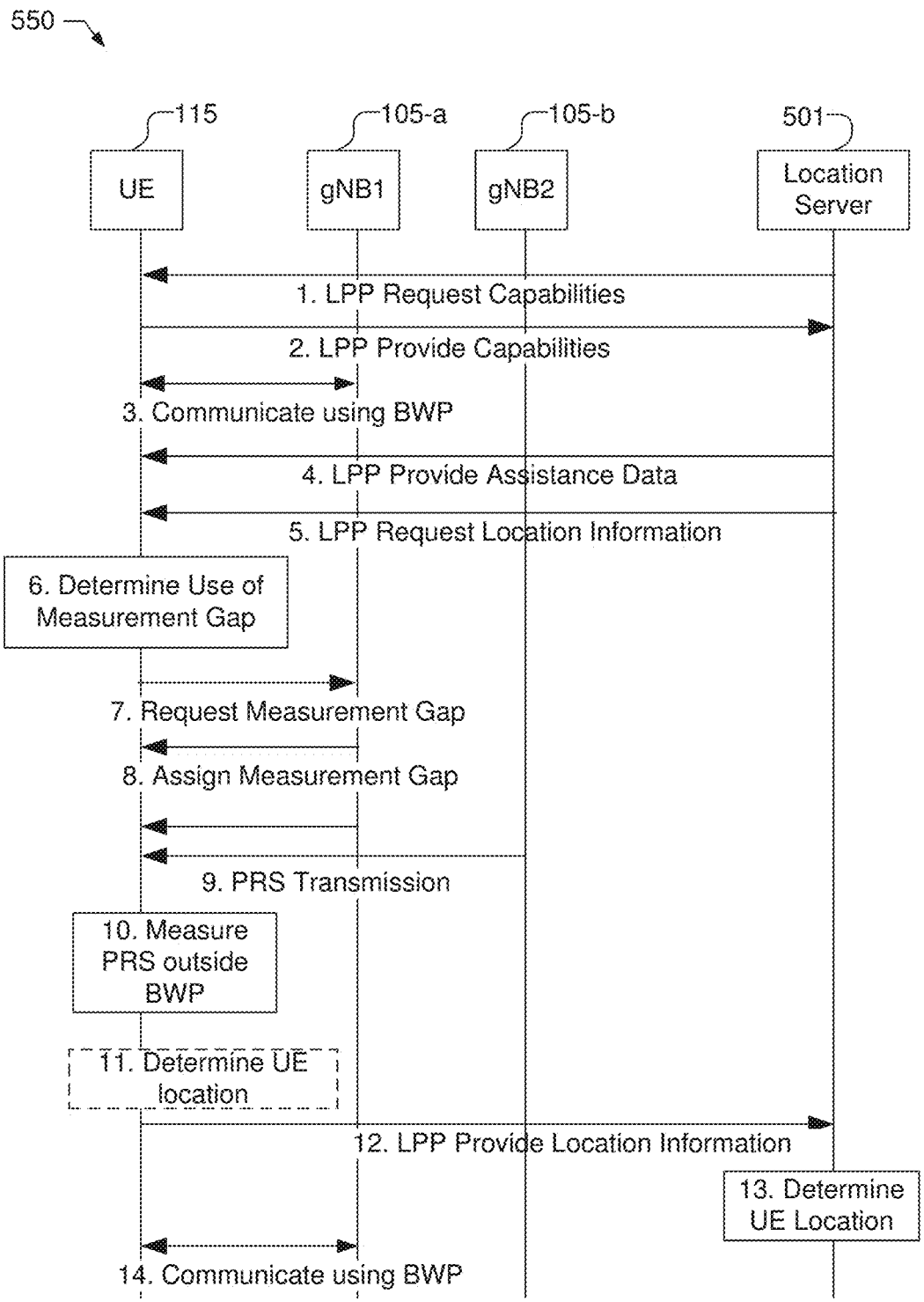
FIG. 5B shows another signaling flow that illustrates various messages sent during a location session and to determine to use a measurement gap for performing positioning measurements outside the BWP of the UE by the UE.

FIG. 5B shows another signaling flow 550 that illustrates various messages sent between components of the communication system 100 depicted in FIGS. 1 and 2, during a location session and to configure a measurement gap for performing positioning measurements outside the BWP of the UE. FIG. 5B illustrates a procedure for a determination by the UE 115 to use a measurement gap for intra-frequency positioning measurements outside the DL BWP of the UE 115.

While the flow diagram 550 is discussed, for ease of illustration, in relation to a 5G NR wireless access using gNBs 105, signaling flows similar to FIG. 5B involving ng-eNBs 114 or eNBs rather than gNBs 105 will be readily apparent to those with ordinary skill in the art. Location server 501 may be, e.g., an LMF 196 for a 5G NR network, or a Secure User Plane Location (SUPL) Location Platform (SLP) 170 or E-SMLC 164 in LTE. Furthermore, in some embodiments, the UE 115 itself may be configured to determine its location using, for example, assistance data provided to it. In the signaling flow 550, it is assumed that the UE 115 and location server 501 communicate using the LPP positioning protocol referred to earlier, although use of NPP or a combination of LPP and NPP is also possible.

At stage 1, the location server 501 sends an LPP Request Capabilities message to the UE 115, e.g., to request the positioning capabilities of the UE 115.

At stage 2, the UE 115 returns an LPP Provide Capabilities message to the location server 501 to provide the positioning capabilities of the UE 115. The positioning capabilities may include, e.g., information about which frequency bands are supported by the UE.

At stage 3, the UE 115 communicates with the serving gNB 105-*a*, using a configured DL bandwidth part (BWP) and UL BWP if assigned. The UE 115 may be configured with the DL BWP including a specific numerology, such as SCS and CP, a band frequency, and a bandwidth in a previous message, not shown.

At stage 4, the location server 501 may send an LPP Provide Assistance Data message to the UE 115 to provide positioning assistance data to assist the UE 115 to acquire and measure the PRS signals and optionally determine a location from the PRS measurements. The assistance data may include one or more of, e.g., the total available bandwidth for the DL PRS signals, groups of DL PRS signals with different numerology and the bandwidths of these groups, and the number of resource blocks for the total available bandwidth of DL PRS signals.

At stage 5, the location server 501 sends an LPP Request Location Information message to the UE 115 to request the UE 115 to measure DL PRS transmission by the gNBs 105. For example, the location server 501 may request measurements of RSTD if OTDOA is used. The location server 501 may also indicate whether UE based positioning is requested whereby the UE 115 determines its own location. In some implementations, the location server 501 may also include in the LPP Request Location Information message a request for location measurements for other position methods which do not use PRS (e.g. WiFi positioning or A-GNSS positioning).

At stage 6, the UE 115 determines whether to use a measurement gap for intra-frequency positioning measurements outside the DL BWP of the UE 115. As discussed above, the UE 115 may determine whether to use a measurement gap for intra-frequency positioning measurements outside the DL BWP of the UE 115 based on several criteria including if the DL BWP of the UE 115 is less than the total available bandwidth for DL PRS transmitted by the gNBs 105 (e.g., as obtained at stage 4), if a first group of DL PRS that are in the DL BWP has a different numerology than a second group of DL PRS signals and the first group has a bandwidth that is less than a bandwidth of the second group (e.g., as obtained at stage 4), if a number of resource blocks for the DL BWP is less than a minimum number of resource blocks required by the UE 115 for positioning measurements, if the DL BWP is less than a minimum fraction of a total available bandwidth of the DL PRS signals (e.g., as obtained at stage 4), and based on a desired positioning accuracy of the UE 115. The determination of whether to use a measurement gap for intra-frequency positioning measurements outside the DL BWP of the UE 115 may be performed in response to the location request at stage 5 or may be performed at an earlier time, e.g., during initialization between the UE 115 and serving base station 105-a, and thus, stage 6 may occur prior to stage 5.

At stage 7, the UE 115 sends a request measurement gap message to the serving gNB 105-a indicating that a measurement gap for intra-frequency positioning measurements outside the DL BWP of the UE 115 is desired, e.g., via RRC.

At stage 8, the location server 501 assigns a measurement gap for intra-frequency positioning measurements outside the DL BWP of the UE 115 and provides the configuration of the measurement gap to the UE 115, e.g., via RRC.

At stage 9, the gNBs 105 transmit DL PRS signals using the full available bandwidth.

At stage 10, the UE 115 may tune its receiver to frequencies outside the DL BWP and to acquire and measure the DL PRS transmitted by the gNBs 105 at stage 9 using frequencies outside the DL BWP of the UE 115. The UE 115, for example, may obtain RSTD measurements when OTDOA is used, TOA or Rx-Rx measurements when RTT is used, or AOA or AOD measurements when AOA or AOD is used. The UE 115 may also obtain other non-PRS measurements in addition of requested at stage 5.

At stage 11, if UE 115 based positioning was requested at stage 5, the UE 115 determines its location based on the PRS measurements (and any other measurements) obtained at stage 10 and the assistance data received at stage 4.

At stage 12, the UE 115 sends an LPP Provide Location Information message to the location server 501 and includes the PRS measurements (and any other measurements) obtained at stage 10 or the UE location obtained at stage 11.

At stage 13, the location server 501 determines the UE location based on any PRS measurements (and any other measurements) received at stage 12 or may verify a UE location received at stage 12.

At stage 14, the UE 115 may tune its receiver to frequencies within the DL BWP and communicate with the serving gNB 105-a, using the configured DL BWP.

Figure 6:
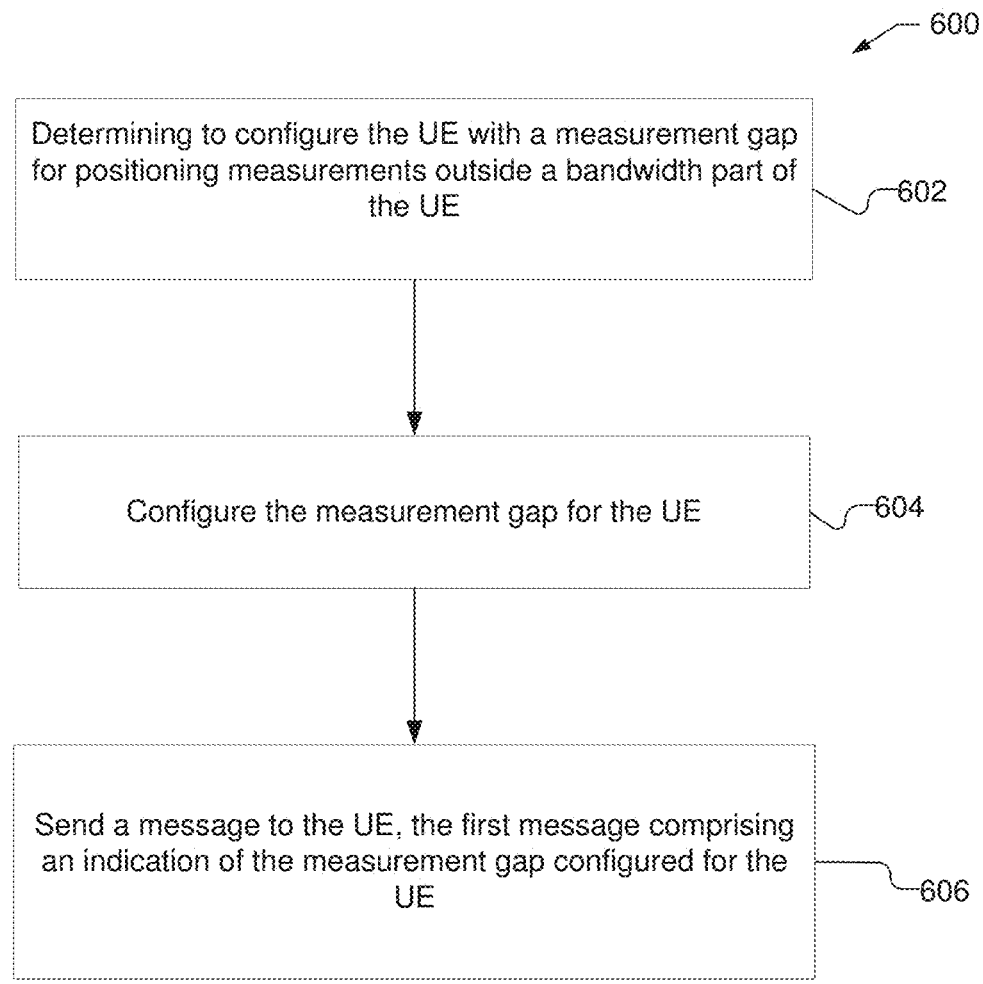
FIG. 6 shows a flowchart of an example procedure for supporting location of a UE performed by a base station in a wireless network.

FIG. 6 shows a flowchart of an example procedure 600 for supporting location of a user equipment (UE) such as the UE 115 in FIGS. 1 and 2, performed by a base station in a wireless network. The procedure 600 may be performed by a base station, such as serving base station 105-a, which may be a gNB, eNB, ng-eNB, or an eNB, which may be configured to transmit radio signals, e.g., according to LTE, or NR protocols.

As illustrated, at block 602, the base station determines to configure the UE with a measurement gap for intra-frequency positioning measurements outside a bandwidth part of the UE, e.g., as illustrated at stage 7 in FIG. 5A or stage 7 of FIG. 5B. At block 604, the base station configures the measurement gap for the UE, e.g., as illustrated at stage 7 in FIG. 5A or stage 7 of FIG. 5B. At block 606, the base station sends a message to the UE, the message comprising an indication of the measurement gap configured for the UE, e.g., as illustrated at stage 8 in FIG. 5A or stage 8 of FIG. 5B.

In one implementation, determining to configure the UE with the measurement gap may comprise determining that the bandwidth part of the UE is less than a total bandwidth of downlink positioning signals transmitted by one or more base stations in the wireless network.

In one implementation, determining to configure the UE with the measurement gap may comprise determining that a first group of downlink positioning signals transmitted by one or more base stations in the wireless network that are in the bandwidth part of the UE has a different numerology than a second group of downlink positioning signals transmitted by the one or more base stations and that the first group of downlink positioning signals has a bandwidth that is less than a bandwidth of the second group of downlink positioning signals.

In one implementation, determining to configure the UE with the measurement gap may comprise receiving a request from the UE to assign the measurement gap for intra-frequency positioning measurements outside the bandwidth part of the UE, e.g., as illustrated at stage 7 of FIG. 5B.

In one implementation, determining to configure the UE with the measurement gap may comprise determining that a number of resource blocks for the bandwidth part of the UE is less than a minimum number of resource blocks required by the UE for intra-frequency positioning measurements.

In one implementation, determining to configure the UE with the measurement gap may comprise determining that the bandwidth part of the UE is less than a minimum fraction of a total bandwidth of downlink positioning signals transmitted by one or more base stations in the wireless network. For example, determining that the bandwidth part of the UE is less than the minimum fraction of the total bandwidth of downlink positioning signals transmitted by one or more base stations in the wireless network may comprise determining that a ratio of the bandwidth part of the UE to the total bandwidth of downlink positioning signals is less than a predetermined threshold. In another example, determining that the bandwidth part of the UE is less than the minimum fraction of the total bandwidth of downlink positioning signals transmitted by one or more base stations in the wireless network may comprise determining that a ratio of a number of resource blocks for the bandwidth part of the UE to a number of resource blocks for the total bandwidth of downlink positioning signals is less than a predetermined threshold.

In one implementation, determining to configure the UE with the measurement gap may be based on a desired positioning accuracy of the UE. For example, in one implementation, the desired positioning accuracy is a function of used bandwidth of downlink positioning signals transmitted by one or more base stations in the wireless network. In one example, determining to configure the UE with the measurement gap may comprise determining that the bandwidth part of the UE is less than a minimum bandwidth of downlink positioning signals transmitted by one or more base stations in the wireless network to produce the desired positioning accuracy of the UE. In another example, determining to configure the UE with the measurement gap may comprise determining that a number of resource blocks for the bandwidth part of the UE is less than a minimum number of resource blocks to produce the desired positioning accuracy of the UE.

Figure 7:
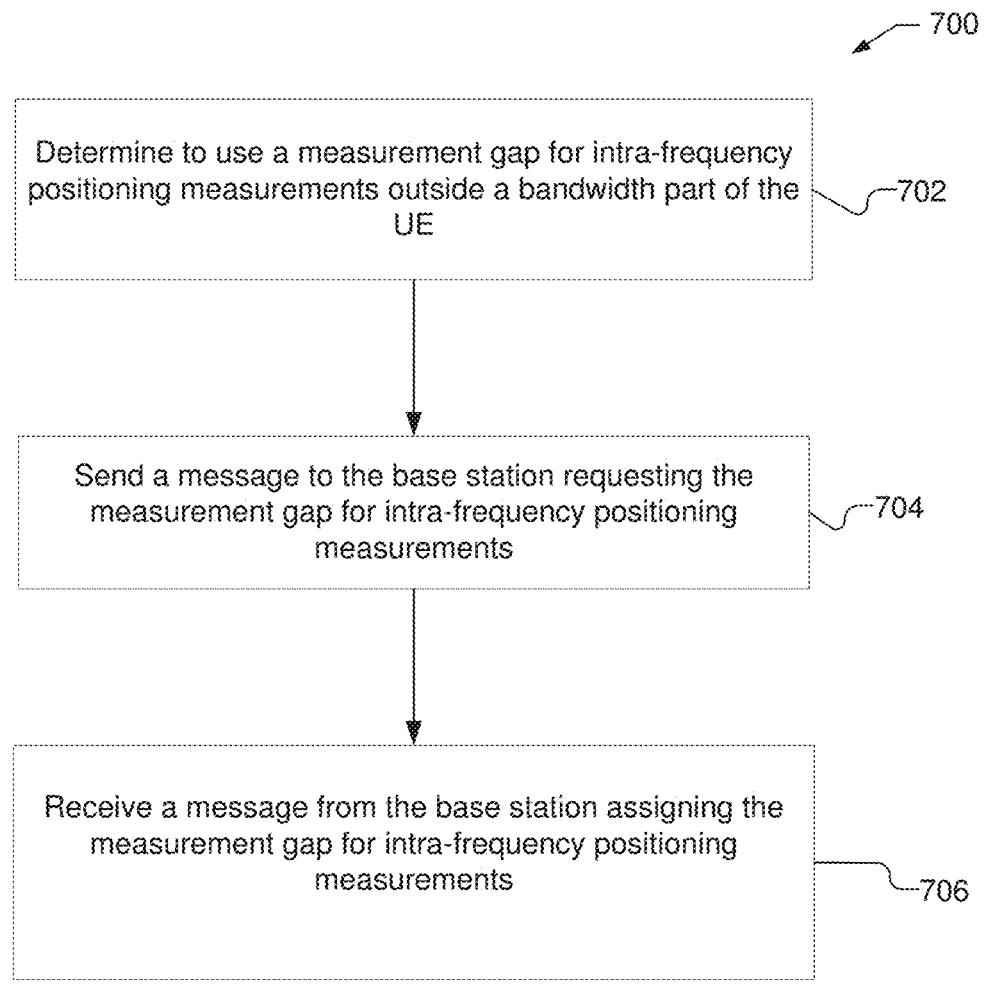
FIG. 7 shows a flowchart of an example procedure for supporting location of a UE performed by the UE.

FIG. 7 shows a flowchart of an example procedure 700 for supporting location of a user equipment (UE) such as the UE 115 in FIGS. 1 and 2, performed by the UE.

As illustrated, at block 702, the UE determines to use a measurement gap for intra-frequency positioning measurements outside a bandwidth part of the UE, e.g., as illustrated at stage 6 of FIG. 5B. At block 704, the UE sends a message to the base station requesting the measurement gap for intra-frequency positioning measurements, e.g., as illustrated at stage 7 of FIG. 5B. At block 706, the UE receives a message from the base station assigning the measurement gap for intra-frequency positioning measurements, e.g., as illustrated at stage 8 of FIG. 5B.

In one implementation, determining to use the measurement gap may comprise determining that the bandwidth part of the UE is less than a total bandwidth of downlink positioning signals transmitted by one or more base stations in the wireless network.

In one implementation, determining to use the measurement gap may comprise determining that a first group of downlink positioning signals transmitted by one or more base stations in the wireless network that are in the bandwidth part of the UE has a different numerology than a second group of downlink positioning signals transmitted by the one or more base stations and that the first group of downlink positioning signals has a bandwidth that is less than a bandwidth of the second group of downlink positioning signals.

In one implementation, determining to use the measurement gap may comprise determining that a number of resource blocks for the bandwidth part of the UE is less than a minimum number of resource blocks required by the UE for intra-frequency positioning measurements.

In one implementation, determining to use the measurement gap may comprise determining that the bandwidth part of the UE is less than a minimum fraction of a total bandwidth of downlink positioning signals transmitted by one or more base stations in the wireless network. For example, determining that the bandwidth part of the UE is less than the minimum fraction of the total bandwidth of downlink positioning signals transmitted by one or more base stations in the wireless network may comprise determining that a ratio of the bandwidth part of the UE to the total bandwidth of downlink positioning signals is less than a predetermined threshold. In another example, determining that the bandwidth part of the UE is less than the minimum fraction of the total bandwidth of downlink positioning signals transmitted by one or more base stations in the wireless network may comprise determining that a ratio of a number of resource blocks for the bandwidth part of the UE to a number of resource blocks for the total bandwidth of downlink positioning signals is less than a predetermined threshold.

In one implementation, determining to use the measurement gap for intra-frequency positioning measurements is based on a desired positioning accuracy of the UE. For example, the desired positioning accuracy may be a function of used bandwidth of downlink positioning signals transmitted by one or more base stations in the wireless network. In one example, determining to use the measurement gap may comprise determining that the bandwidth part of the UE is less than a minimum bandwidth of downlink positioning signals transmitted by one or more base stations in the wireless network to produce the desired positioning accuracy of the UE. In another example, determining to use the measurement gap may comprise determining that a number of resource blocks for the bandwidth part of the UE is less than a minimum number of resource blocks to produce the desired positioning accuracy of the UE.

Figure 8:
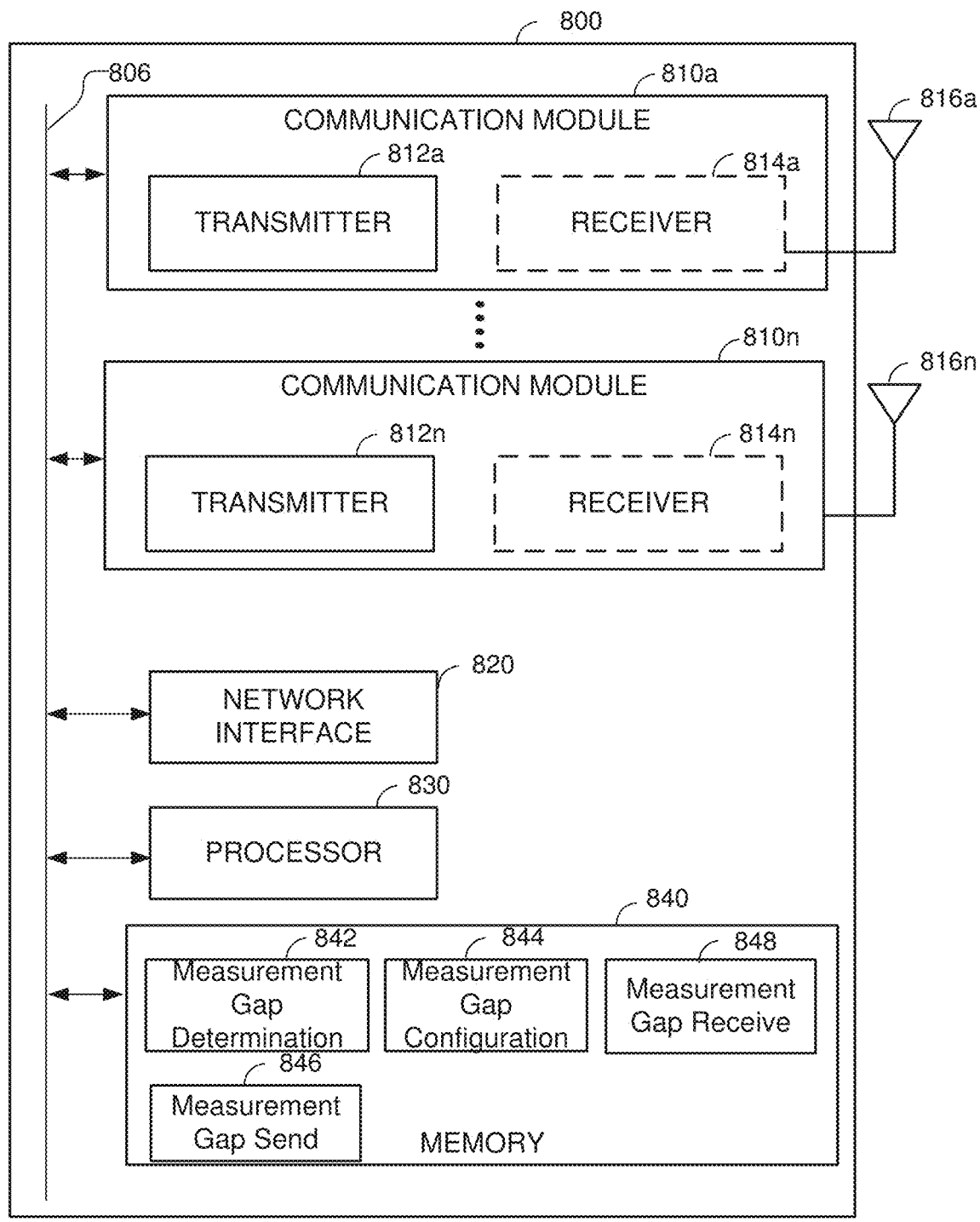
FIG. 8 is a block diagram of an embodiment of a base station capable of determining to use a measurement gap for performing positioning measurements outside the BWP of the UE.

FIG. 8 shows a schematic diagram of a hardware implementation of a base station 800, such as a base station 105, which may be a gNB, an ng-eNB, or an eNB, which may be similar to, and be configured to have a functionality similar to that depicted or described, for example, with reference to FIGS. 1-3, and 5A-7. The base station 800 may include one or more communication modules 810a-n, sometimes referred to as external interfaces, electrically coupled to one more antennas 816a-n for communicating with wireless devices, such as, for example, the UE 115 of FIG. 1. The each of the communication modules 810a-810n may include a respective transmitter 812a-n for sending signals (e.g., downlink messages and signals, which may be arranged in frames, and which may include positioning reference signals and/or assistance data whose quantity may be controlled/varied as described herein) and, optionally (e.g., for nodes configured to receive and process uplink communications) a respective receiver 814a-n. In embodiments in which the implemented node includes both a transmitter and a receiver, the communication module comprising the transmitter and receiver may be referred to as a transceiver. The base station 800 may also include a network interface 820 to communicate with other network nodes (e.g., sending and receiving queries and responses). For example, each network element may be configured to communicate (e.g., via wired or wireless backhaul communication) with a gateway, or other suitable device of a network, to facilitate communication with one or more core network nodes (e.g., any of the other nodes and elements shown in FIG. 1). Additionally, and/or alternatively, communication with other network nodes may also be performed using the communication modules 810a-n and/or the respective antennas 816a-n.

The base station 800 may also include other components that may be used with embodiments described herein. For example, the base station 800 may further include a location server to support positioning of a target UE.

The base station 800 may include, in some embodiments, at least one processor 830 (also referred to as a controller) and memory 840 to manage communications with other nodes (e.g., sending and receiving messages), to generate communication signals (including to generate communication frames, signals and/or messages with adjustable quantities of resources that are allocated for location-related information such as PRS transmissions and assistance data transmissions), and to provide other related functionality, including functionality to implement the various processes and methods described herein. The one or more processors 830 and memory 840 may be coupled together with bus 806. The one or more processors 830 and other components of the base station 800 may similarly be coupled together with bus 806, a separate bus, or may be directly connected together or coupled using a combination of the foregoing. The memory 840 may contain executable code or software instructions that when executed by the one or more processors 830 cause the one or more processors 830 to operate as a special purpose computer programmed to perform the procedures and techniques disclosed herein (e.g. such as the process flows 1000).

As illustrated in FIG. 8, the memory 840 includes one or more components or modules that when implemented by the one or more processors 830 implements the methodologies as described herein. While the components or modules are illustrated as software in memory 840 that is executable by the one or more processors 830, it should be understood that the components or modules may be dedicated hardware either in the processor or off processor. As illustrated, the memory 840 may include a measurement gap determination module 842 that enables the one or more processors 830 to determine whether to use a measurement gap for intra-frequency positioning measurements outside the DL BWP of a UE. The memory 840 may include a measurement gap configuration module 844 that enables the one or more processors 830 to configure the measurement gap for the UE. The memory 840 may further include measurement gap send module 846, which enables the one or more processors 830 to send, via transceiver 810, a message to UE with an indication of the measurement gap configured for the UE. The memory 840 may further include a measurement gap receive module 848, which enables the one or more processors 830 to receive, via transceiver 810, a message from a UE requesting the measurement gap.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 840, and are configured to cause the one or more processors to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

In one implementation, a base station in a wireless network, such as base station 800, may be configured to support location of a user equipment (UE) and may include means for determining to configure the UE with a measurement gap for intra-frequency positioning measurements outside a bandwidth part of the UE, which may be, e.g., the communication module 810 and one or more processors 830 with dedicated hardware or implementing executable code or software instructions in memory 840 such as the measurement gap determination module 842. A means for configuring the measurement gap for the UE may be, e.g., the communication module 810 and one or more processors 830 with dedicated hardware or implementing executable code or software instructions in memory 840 such as the measurement gap configuration module 844. A means for sending a message to the UE, the message comprising an indication of the measurement gap configured for the UE may be, e.g., the communication module 810 and one or more processors 830 with dedicated hardware or implementing executable code or software instructions in memory 840 such as the measurement gap send module 846.

In one implementation, the base station may include a means for determining that the bandwidth part of the UE is less than a total bandwidth of downlink positioning signals transmitted by one or more base stations in the wireless network, which may be, e.g., the communication module 810 and one or more processors 830 with dedicated hardware or implementing executable code or software instructions in memory 840 such as the measurement gap determination module 842.

In one implementation, the base station may include a means for determining that a first group of downlink positioning signals transmitted by one or more base stations in the wireless network that are in the bandwidth part of the UE has a different numerology than a second group of downlink positioning signals transmitted by the one or more base stations and that the first group of downlink positioning signals has a bandwidth that is less than a bandwidth of the second group of downlink positioning signals, which may be, e.g., the communication module 810 and one or more processors 830 with dedicated hardware or implementing executable code or software instructions in memory 840 such as the measurement gap determination module 842.

In one implementation, the base station may include a means for receiving a request from the UE to assign the measurement gap for intra-frequency positioning measurements outside the bandwidth part of the UE, which may be, e.g., the communication module 810 and one or more processors 830 with dedicated hardware or implementing executable code or software instructions in memory 840 such as the measurement gap receive module 848.

In one implementation, the base station may include a means for determining that a number of resource blocks for the bandwidth part of the UE is less than a minimum number of resource blocks required by the UE for intra-frequency positioning measurements, which may be, e.g., the communication module 810 and one or more processors 830 with dedicated hardware or implementing executable code or software instructions in memory 840 such as the measurement gap determination module 842.

In one implementation, the base station may include a means for determining that the bandwidth part of the UE is less than a minimum fraction of a total bandwidth of downlink positioning signals transmitted by one or more base stations in the wireless network, which may be, e.g., the communication module 810 and one or more processors 830 with dedicated hardware or implementing executable code or software instructions in memory 840 such as the measurement gap determination module 842. For example, the base station may include a means for determining that a ratio of the bandwidth part of the UE to the total bandwidth of downlink positioning signals is less than a predetermined threshold, which may be, e.g., the communication module 810 and one or more processors 830 with dedicated hardware or implementing executable code or software instructions in memory 840 such as the measurement gap determination module 842. In another example, the base station may include a means for determining that a ratio of a number of resource blocks for the bandwidth part of the UE to a number of resource blocks for the total bandwidth of downlink positioning signals is less than a predetermined threshold, which may be, e.g., the communication module 810 and one or more processors 830 with dedicated hardware or implementing executable code or software instructions in memory 840 such as the measurement gap determination module 842.

In one implementation, the means for determining to configure the UE with the measurement gap may use a desired positioning accuracy of the UE. For example, the desired positioning accuracy may be a function of used bandwidth of downlink positioning signals transmitted by one or more base stations in the wireless network. In one example, the base station may include a means for determining that the bandwidth part of the UE is less than a minimum bandwidth of downlink positioning signals transmitted by one or more base stations in the wireless network to produce the desired positioning accuracy of the UE, which may be, e.g., the communication module 810 and one or more processors 830 with dedicated hardware or implementing executable code or software instructions in memory 840 such as the measurement gap determination module 842. In one example, the base station may include a means for determining that a number of resource blocks for the bandwidth part of the UE is less than a minimum number of resource blocks to produce the desired positioning accuracy of the UE, which may be, e.g., the communication module 810 and one or more processors 830 with dedicated hardware or implementing executable code or software instructions in memory 840 such as the measurement gap determination module 842.

Figure 9:
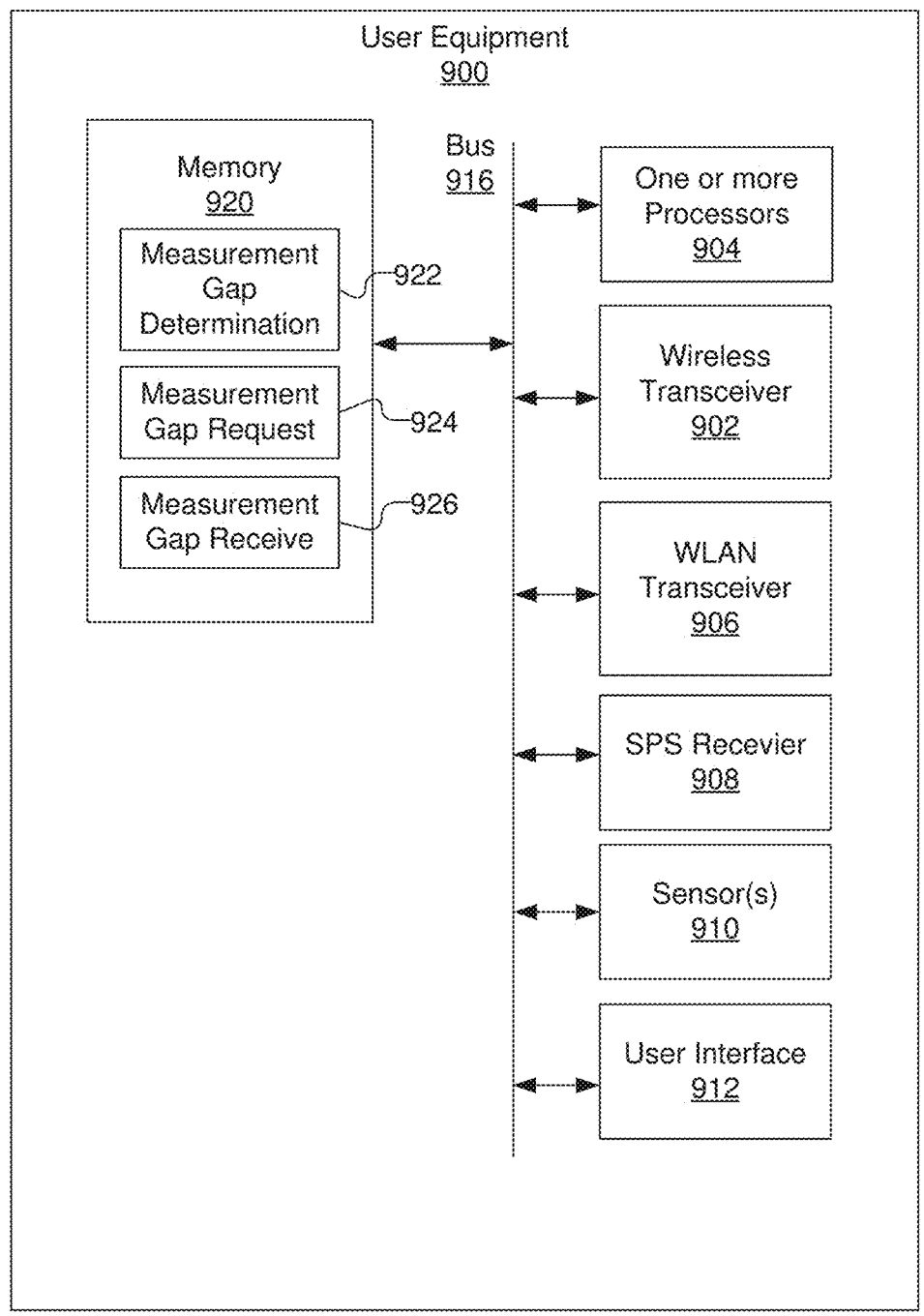
FIG. 9 is a block diagram of an embodiment of a UE capable of determining to use a measurement gap for performing positioning measurements outside the BWP of the UE.

FIG. 9 is a diagram illustrating an example of a hardware implementation of a user equipment (UE) 900, such as UE 115. The UE 900 may include a wireless transceiver 902 to wirelessly communicate with a network entity, e.g., such as base station 105. The UE 900 may also include additional transceivers, such a wireless local area network (WLAN) transceiver 906, as well as an SPS receiver 908 for receiving and measuring signals from SPS SVs. The UE 900 may further include one or more sensors 910, such as cameras, accelerometers, gyroscopes, electronic compass, magnetometer, barometer, etc. The UE 900 may further include a user interface 912 that may include e.g., a display, a keypad or other input device, such as virtual keypad on the display, through which a user may interface with the UE 900. The UE 900 further includes one or more processors 904 and memory 920, which may be coupled together with bus 916. The one or more processors 904 and other components of the UE 900 may similarly be coupled together with bus 916, a separate bus, or may be directly connected together or coupled using a combination of the foregoing. The memory 920 may contain executable code or software instructions that when executed by the one or more processors 904 cause the one or more processors to operate as a special purpose computer programmed to perform the algorithms disclosed herein.

As illustrated in FIG. 9, the memory 920 may include one or more components or modules that may be implemented by the one or more processors 904 to perform the methodologies described herein. While the components or modules are illustrated as software in memory 920 that is executable by the one or more processors 904, it should be understood that the components or modules may be dedicated hardware either in the one or more processors 904 or off the processors.

As illustrated, the memory 920 includes one or more components or modules that when implemented by the one or more processors 904 implements the methodologies as described herein. While the components or modules are illustrated as software in memory 920 that is executable by the one or more processors 904, it should be understood that the components or modules may be dedicated hardware either in the processor or off processor. As illustrated, the memory 920 may include a measurement gap determination module 922 that enables the one or more processors 904 to determine whether to use a measurement gap for intra-frequency positioning measurements outside the DL BWP of a UE. The memory 920 may include a measurement gap request module 924 that enables the one or more processors 904 to send, via transceiver 902, a message to the base station with a request for a measurement gap. The memory 920 may further include a measurement gap receive module 926, which enables the one or more processors 904 to receive, via transceiver 902, a message from the location server with an indication of the measurement gap configured for the UE.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 920, and are configured to cause the one or more processors to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

In one implementation, a user equipment (UE), such as UE 900, may be capable of supporting location of the UE and may include a means for determining to use a measurement gap for intra-frequency positioning measurements outside a bandwidth part of the UE, which may be, e.g., the wireless transceiver 902 and one or more processors 830 with dedicated hardware or implementing executable code or software instructions in memory 920 such as the measurement gap determination module 922. A means for sending a message to a base station in a wireless network requesting the measurement gap for intra-frequency positioning measurements may be, e.g., the wireless transceiver 902 and one or more processors 830 with dedicated hardware or implementing executable code or software instructions in memory 920 such as the measurement gap request module 924. A means for receiving a message from the base station assigning the measurement gap for intra-frequency positioning measurements may be, e.g., the wireless transceiver 902 and one or more processors 830 with dedicated hardware or implementing executable code or software instructions in memory 920 such as the measurement gap receive module 926.

In one implementation, the UE may include a means for determining that the bandwidth part of the UE is less than a total bandwidth of downlink positioning signals transmitted by one or more base stations in the wireless network, which may be, e.g., the wireless transceiver 902 and one or more processors 830 with dedicated hardware or implementing executable code or software instructions in memory 920 such as the measurement gap determination module 922.

In one implementation, the UE may include a means for determining that a first group of downlink positioning signals transmitted by one or more base stations in the wireless network that are in the bandwidth part of the UE has a different numerology than a second group of downlink positioning signals transmitted by the one or more base stations and that the first group of downlink positioning signals has a bandwidth that is less than a bandwidth of the second group of downlink positioning signals, which may be, e.g., the wireless transceiver 902 and one or more processors 830 with dedicated hardware or implementing executable code or software instructions in memory 920 such as the measurement gap determination module 922.

In one implementation, the UE may include a means for determining that a number of resource blocks for the bandwidth part of the UE is less than a minimum number of resource blocks required by the UE for intra-frequency positioning measurements, which may be, e.g., the wireless transceiver 902 and one or more processors 830 with dedicated hardware or implementing executable code or software instructions in memory 920 such as the measurement gap determination module 922.

In one implementation, the UE may include a means for determining that the bandwidth part of the UE is less than a minimum fraction of a total bandwidth of downlink positioning signals transmitted by one or more base stations in the wireless network, which may be, e.g., the wireless transceiver 902 and one or more processors 830 with dedicated hardware or implementing executable code or software instructions in memory 920 such as the measurement gap determination module 922. For example, the UE may include a means for determining that a ratio of the bandwidth part of the UE to the total bandwidth of downlink positioning signals is less than a predetermined threshold, which may be, e.g., the wireless transceiver 902 and one or more processors 830 with dedicated hardware or implementing executable code or software instructions in memory 920 such as the measurement gap determination module 922. The UE may include a means for determining that a ratio of a number of resource blocks for the bandwidth part of the UE to a number of resource blocks for the total bandwidth of downlink positioning signals is less than a predetermined threshold, which may be, e.g., the wireless transceiver 902 and one or more processors 830 with dedicated hardware or implementing executable code or software instructions in memory 920 such as the measurement gap determination module 922.

In one implementation, the means for determining to use the measurement gap for intra-frequency positioning measurements may use a desired positioning accuracy of the UE. In one implementation, the desired positioning accuracy may be a function of used bandwidth of downlink positioning signals transmitted by one or more base stations in the wireless network. In one implementation, the UE may include a means for determining that the bandwidth part of the UE is less than a minimum bandwidth of downlink positioning signals transmitted by one or more base stations in the wireless network to produce the desired positioning accuracy of the UE, which may be, e.g., the wireless transceiver 902 and one or more processors 830 with dedicated hardware or implementing executable code or software instructions in memory 920 such as the measurement gap determination module 922. In one implementation, the UE may include a means for determining that a number of resource blocks for the bandwidth part of the UE is less than a minimum number of resource blocks to produce the desired positioning accuracy of the UE, which may be, e.g., the wireless transceiver 902 and one or more processors 830 with dedicated hardware or implementing executable code or software instructions in memory 920 such as the measurement gap determination module 922.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device, user equipment (UE), or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device". "wireless device" or "user equipment") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, a "mobile station" or "user equipment" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station" or "user equipment." A mobile device or user equipment (UE) may also be referred to as a mobile terminal, a terminal, a device, a Secure User Plane Location Enabled Terminal (SET), a target device, a target, or by some other name.

In an embodiment, a first example independent claim may include a method for supporting location of a user equipment (UE) at a first wireless node, comprising receiving a first request for broadcast of an increased quantity of location-related information, the broadcast based on a wireless access type for the first wireless node; and broadcasting the increased quantity of location-related information using the wireless access type and based on the first request.

While some of the techniques, processes, and/or implementations presented herein may comply with all or part of one or more standards, such techniques, processes, and/or implementations may not, in some embodiments, comply with part or all of such one or more standards.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method for supporting location of a user equipment (UE) performed by a base station in a wireless network, comprising:
   receiving a request from the UE to assign a measurement gap for intra-frequency positioning measurements outside a bandwidth part of the UE;
   determining to configure the UE with the measurement gap based on (1) that the bandwidth part of the UE is less than a total bandwidth of downlink positioning signals transmitted by one or more base stations in the wireless network or (2) that the bandwidth part of the UE is less than a minimum bandwidth of the downlink positioning signals transmitted by the one or more base stations in the wireless network to produce a desired positioning accuracy of the UE, wherein the measurement gap is for the UE to perform the intra-frequency positioning measurements for a set of positioning signals that is outside the bandwidth part of the UE during a positioning session of the UE;

configuring the measurement gap for the UE to enable the UE to perform the intra-frequency positioning measurements for the set of positioning signals that is outside the bandwidth part of the UE during the positioning session of the UE;

sending a message to the UE, the message comprising an indication of the measurement gap configured for the UE; and transmitting at least one positioning signal to the UE that is outside the bandwidth part of the UE during the positioning session of the UE.

2. The method of claim 1, wherein the desired positioning accuracy is a function of used bandwidth of the downlink positioning signals transmitted by the one or more base stations in the wireless network.

3. The method of claim 1, wherein determining to configure the UE with the measurement gap further comprises:
determining that a first group of downlink positioning signals transmitted by the one or more base stations in the wireless network that are in the bandwidth part of the UE has a different numerology than a second group of downlink positioning signals transmitted by the one or more base stations and that the first group of downlink positioning signals has a bandwidth that is less than a bandwidth of the second group of downlink positioning signals.

4. The method of claim 1, wherein determining to configure the UE with the measurement gap further comprises:
determining that a number of resource blocks for the bandwidth part of the UE is less than a minimum number of resource blocks required by the UE for the intra-frequency positioning measurements.

5. The method of claim 1, wherein determining to configure the UE with the measurement gap further comprises:
determining that the bandwidth part of the UE is less than a minimum fraction of the total bandwidth of the downlink positioning signals transmitted by the one or more base stations in the wireless network.

6. The method of claim 5, wherein determining that the bandwidth part of the UE is less than the minimum fraction of the total bandwidth of the downlink positioning signals transmitted by the one or more base stations in the wireless network comprises:
determining that a ratio of the bandwidth part of the UE to the total bandwidth of the downlink positioning signals is less than a predetermined threshold.

7. The method of claim 5, wherein determining that the bandwidth part of the UE is less than the minimum fraction of the total bandwidth of the downlink positioning signals transmitted by the one or more base stations in the wireless network comprises:
determining that a ratio of a number of resource blocks for the bandwidth part of the UE to a number of resource blocks for the total bandwidth of the downlink positioning signals is less than a predetermined threshold.

8. The method of claim 1, wherein determining to configure the UE with the measurement gap comprises:
determining that a number of resource blocks for the bandwidth part of the UE is less than a minimum number of resource blocks to produce the desired positioning accuracy of the UE.

9. A base station in a wireless network capable of supporting location of a user equipment (UE), comprising:
an external interface configured to receive and send messages to other entities in the wireless network;
at least one memory; and
at least one processor coupled to the external interface and the at least one memory, the at least one processor configured to:
receive a request from the UE, via the external interface, to assign a measurement gap for intra-frequency positioning measurements outside a bandwidth part of the UE;
determine to configure the UE with the measurement gap based on (1) that the bandwidth part of the UE is less than a total bandwidth of downlink positioning signals transmitted by one or more base stations in the wireless network or (2) that the bandwidth part of the UE is less than a minimum bandwidth of the downlink positioning signals transmitted by the one or more base stations in the wireless network to produce a desired positioning accuracy of the UE, wherein the measurement gap is for the UE to perform the intra-frequency positioning measurements for a set of positioning signals that is outside the bandwidth part of the UE during a positioning session of the UE;
configure the measurement gap for the UE to enable the UE to perform the intra-frequency positioning measurements for the set of positioning signals that is outside the bandwidth part of the UE during the positioning session of the UE;
send a message to the UE via the external interface, the message comprising an indication of the measurement gap configured for the UE; and
transmit at least one positioning signal to the UE that is outside the bandwidth part of the UE during the positioning session of the UE.

10. The base station of claim 9, wherein the desired positioning accuracy is a function of used bandwidth of the downlink positioning signals transmitted by the one or more base stations in the wireless network.

11. The base station of claim 9, wherein the at least one processor is configured to determine to configure the UE with the measurement gap by being further configured to:
determine that a first group of downlink positioning signals transmitted by the one or more base stations in the wireless network that are in the bandwidth part of the UE has a different numerology than a second group of downlink positioning signals transmitted by the one or more base stations and that the first group of downlink positioning signals has a bandwidth that is less than a bandwidth of the second group of downlink positioning signals.

12. The base station of claim 9, wherein the at least one processor is configured to determine to configure the UE with the measurement gap by being further configured to:
determine that a number of resource blocks for the bandwidth part of the UE is less than a minimum number of resource blocks required by the UE for the intra-frequency positioning measurements.

13. The base station of claim 9, wherein the at least one processor is configured to determine to configure the UE with the measurement gap by being further configured to:
determine that the bandwidth part of the UE is less than a minimum fraction of the total bandwidth of the downlink positioning signals transmitted by the one or more base stations in the wireless network.

14. The base station of claim 13, wherein the at least one processor is configured to determine that the bandwidth part of the UE is less than the minimum fraction of the total bandwidth of the downlink positioning signals transmitted by the one or more base stations in the wireless network by being configured to:
    determine that a ratio of the bandwidth part of the UE to the total bandwidth of the downlink positioning signals is less than a predetermined threshold.

15. The base station of claim 13, wherein the at least one processor is configured to determine that the bandwidth part of the UE is less than the minimum fraction of the total bandwidth of the downlink positioning signals transmitted by the one or more base stations in the wireless network by being configured to:
    determine that a ratio of a number of resource blocks for the bandwidth part of the UE to a number of resource blocks for the total bandwidth of the downlink positioning signals is less than a predetermined threshold.

16. The base station of claim 9, wherein the at least one processor is configured to determine to configure the UE with the measurement gap by being configured to:
    determine that a number of resource blocks for the bandwidth part of the UE is less than a minimum number of resource blocks to produce the desired positioning accuracy of the UE.

17. A method for supporting location of a user equipment (UE) performed by the UE, comprising:
    determining, based on (1) that a bandwidth part of the UE is less than a total bandwidth of downlink positioning signals transmitted by one or more base stations in a wireless network or (2) that the bandwidth part of the UE is less than a minimum bandwidth of the downlink positioning signals transmitted by the one or more base stations in the wireless network to produce a desired positioning accuracy of the UE, to use a measurement gap for intra-frequency positioning measurements for a set of positioning signals that is outside a bandwidth part of the UE during a positioning session of the UE;
    sending a request to a base station in the wireless network requesting the measurement gap for the intra-frequency positioning measurements;
    receiving, based on the request, a message from the base station assigning the measurement gap for the intra-frequency positioning measurements; and
    performing the intra-frequency positioning measurements for the set of positioning signals that is outside the bandwidth part of the UE during the positioning session of the UE.

18. The method of claim 17, wherein the desired positioning accuracy is a function of used bandwidth of the downlink positioning signals transmitted by the one or more base stations in the wireless network.

19. The method of claim 17, wherein determining to use the measurement gap further comprises:
    determining that a first group of downlink positioning signals transmitted by the one or more base stations in the wireless network that are in the bandwidth part of the UE has a different numerology than a second group of downlink positioning signals transmitted by the one or more base stations and that the first group of downlink positioning signals has a bandwidth that is less than a bandwidth of the second group of downlink positioning signals.

20. The method of claim 17, wherein determining to use the measurement gap further comprises:
    determining that a number of resource blocks for the bandwidth part of the UE is less than a minimum number of resource blocks required by the UE for the intra-frequency positioning measurements.

21. The method of claim 17, wherein determining to use the measurement gap further comprises:
    determining that the bandwidth part of the UE is less than a minimum fraction of the total bandwidth of the downlink positioning signals transmitted by the one or more base stations in the wireless network.

22. The method of claim 21, wherein determining that the bandwidth part of the UE is less than the minimum fraction of the total bandwidth of the downlink positioning signals transmitted by the one or more base stations in the wireless network comprises:
    determining that a ratio of the bandwidth part of the UE to the total bandwidth of the downlink positioning signals is less than a predetermined threshold.

23. The method of claim 21, wherein determining that the bandwidth part of the UE is less than the minimum fraction of the total bandwidth of the downlink positioning signals transmitted by the one or more base stations in the wireless network comprises:
    determining that a ratio of a number of resource blocks for the bandwidth part of the UE to a number of resource blocks for the total bandwidth of the downlink positioning signals is less than a predetermined threshold.

24. The method of claim 17, wherein determining to use the measurement gap comprises:
    determining that a number of resource blocks for the bandwidth part of the UE is less than a minimum number of resource blocks to produce the desired positioning accuracy of the UE.

25. A user equipment (UE) capable of supporting location of the UE, comprising:
    an external interface configured to receive and send messages to entities in a wireless network;
    at least one memory; and
    at least one processor coupled to the external interface and the at least one memory, the at least one processor configured to:
    determine, based on (1) that a bandwidth part of the UE is less than a total bandwidth of downlink positioning signals transmitted by one or more base stations in the wireless network or (2) that the bandwidth part of the UE is less than a minimum bandwidth of the downlink positioning signals transmitted by the one or more base stations in the wireless network to produce a desired positioning accuracy of the UE, to use a measurement gap for intra-frequency positioning measurements for a set of positioning signals that is outside a bandwidth part of the UE during a positioning session of the UE;
    send a request to a base station in the wireless network, via the external interface, requesting the measurement gap for the intra-frequency positioning measurements;
    receive, based on the request, a message from the base station, via the external interface, assigning the measurement gap for the intra-frequency positioning measurements; and
    perform the intra-frequency positioning measurements for the set of positioning signals that is outside the bandwidth part of the UE during the positioning session of the UE.

26. The UE of claim 25, wherein the desired positioning accuracy is a function of used bandwidth of the downlink positioning signals transmitted by the one or more base stations in the wireless network.

27. The UE of claim 25, wherein the at least one processor is configured to determine to use the measurement gap by being further configured to:

determine that a first group of downlink positioning signals transmitted by the one or more base stations in the wireless network that are in the bandwidth part of the UE has a different numerology than a second group of downlink positioning signals transmitted by the one or more base stations and that the first group of downlink positioning signals has a bandwidth that is less than a bandwidth of the second group of downlink positioning signals.

28. The UE of claim 25, wherein the at least one processor is configured to determine to use the measurement gap by being further configured to:
determine that a number of resource blocks for the bandwidth part of the UE is less than a minimum number of resource blocks required by the UE for the intra-frequency positioning measurements.

29. The UE of claim 25, wherein the at least one processor is configured to determine to use the measurement gap by being further configured to:
determine that the bandwidth part of the UE is less than a minimum fraction of the total bandwidth of the downlink positioning signals transmitted by the one or more base stations in the wireless network.

30. The UE of claim 29, wherein the at least one processor is configured to determine that the bandwidth part of the UE is less than the minimum fraction of the total bandwidth of the downlink positioning signals transmitted by the one or more base stations in the wireless network by being configured to:
determine that a ratio of the bandwidth part of the UE to the total bandwidth of the downlink positioning signals is less than a predetermined threshold.

31. The UE of claim 29, wherein the at least one processor is configured to determine that the bandwidth part of the UE is less than the minimum fraction of the total bandwidth of the downlink positioning signals transmitted by the one or more base stations in the wireless network by being configured to:
determine that a ratio of a number of resource blocks for the bandwidth part of the UE to a number of resource blocks for the total bandwidth of the downlink positioning signals is less than a predetermined threshold.

32. The UE of claim 25, wherein the at least one processor is configured to determine to use the measurement gap by being configured to:
determine that a number of resource blocks for the bandwidth part of the UE is less than a minimum number of resource blocks to produce the desired positioning accuracy of the UE.

* * * * *